(12) United States Patent
Arnold et al.

(10) Patent No.: US 6,502,000 B1
(45) Date of Patent: Dec. 31, 2002

(54) METHOD AND APPARATUS FOR DEVICE CONTROL

(75) Inventors: Patrick Simon Arnold, Boise, ID (US); Peter James Macer, Bristol (GB); Peter Michael Williams, North Somerset (GB)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/367,923

(22) PCT Filed: Apr. 15, 1998

(86) PCT No.: PCT/GB98/01097

§ 371 (c)(1),
(2), (4) Date: Aug. 20, 1999

(87) PCT Pub. No.: WO98/47076

PCT Pub. Date: Oct. 22, 1998

Related U.S. Application Data

(60) Provisional application No. 60/054,047, filed on Jul. 18, 1997.

(30) Foreign Application Priority Data

Apr. 15, 1997 (GB) .............................................. 9707551

(51) Int. Cl.⁷ ........................ G05B 15/00; G06F 15/177
(52) U.S. Cl. ............................ 700/83; 700/17; 345/746
(58) Field of Search .............................. 700/52, 17, 83, 700/2, 9, 84, 85; 345/718, 746, 762, 740, 771, 773; 710/10, 11, 16, 19, 62, 63, 72, 8, 14; 713/1, 100; 712/1; 709/230

(56) References Cited

U.S. PATENT DOCUMENTS

| | | | |
|---|---|---|---|
| 5,317,693 A | | 5/1994 | Cuenod et al. ............. 395/275 |
| 5,537,605 A | * | 7/1996 | Teece ........................... 712/1 |
| 5,657,221 A | * | 8/1997 | Warman et al. ............... 700/83 |
| 6,020,881 A | * | 2/2000 | Naughton et al. ........... 345/740 |

FOREIGN PATENT DOCUMENTS

| | | |
|---|---|---|
| EP | 0 116 694 | 8/1984 |
| WO | WO 94/27223 | 11/1994 |

OTHER PUBLICATIONS de Baar, Dennis, J.M.J., et al., "Coupling Application Design and User Interface Design", *Human Factors in Computing Systems*, CHI'89 Conference Proceedings, May 1992, pp. 259–266.

Johnson, Jeff, "Selectors: Going Beyond User–Interface Widgets", *Human Factors in Computing Systems*, CHI'89 Conference Proceedings, May 1992, pp. 273–379.

(List continued on next page.)

*Primary Examiner*—Maria N. Von Buhr
*Assistant Examiner*—Steven R. Garland

(57) ABSTRACT

A method and apparatus are provided by which one device (12) can be used to control another device (11) without any requirement that the controlling device (12) has any knowledge of the nature or functionality of the controlled device (11). The controlled device (11) transmits to the controlling device (12) a set of possible parameter choices, together with information identifying the possible parameter choices. The controlling device (12) then displays (or otherwise provides to the user) both the set of parameter choices and the information so that a user (13) is able to select a set of actual parameter choices through the user interface of the controlling device (12). The set of actual parameter choices is then transmitted back to the controlled device (11), whose operational parameters are then modified in accordance with the set of actual parameter choices. The controlling device (12) thus needs no knowledge of the nature of the controlled device (11), as it only has to present the information and choices provided by the controlled device itself to the user (13). The nature of this presentation can be determined by the display and user interface capabilities of the controlling device.

33 Claims, 15 Drawing Sheets

OTHER PUBLICATIONS

Olsen, Dan R., "A Programming Language Basis for User Interface Management", *Human Factors in Computing Systems*, CHI'89 Conference Proceedings, May 1989, pp. 171–176.

Wiecha, Charles, et al., "Generating Highly Interactive User Interfaces", *Human Factors in Computer Systems*, CHI'89 Conference Proceedings, May 1989, pp. 277–282.

Zanden, Brad V., et al., "Automatic, Look-and-Feel Independent Dialog Creation for Graphical User Interfaces", *Human Factors in Computing Systems*, CHI'89 Conference Proceedings, Apr. 1990, pp. 27–34.

"HP JetSend Technology: Making Device-To-Device communication simple" *HP Press Release*, Jul. 1997, pp. 1–4.

* cited by examiner

|     |               |                              |
|-----|---------------|------------------------------|
| 91  | Initialize    | Initialize                   |
| 92  | SurfaceRequestMsg ⟶ |                        |
| 93  |               | ⟵ SurfaceMsg                 |
| 94  | ContentRequestMsg ⟶ |                        |
| 95  |               | ⟵ ContentReplyMsg            |
| 96  | Display to user |                            |

|     |                  |                                          |
|-----|------------------|------------------------------------------|
| 101 | SurfaceChangeMsg ⟶ |                                       |
|     | Change to content: Requests and Replies |                   |
| 102 |                  | ⟵ SurfaceChangeMsg (accept or reject)    |
| 103 | Updating         | Updating                                 |

METHOD AND APPARATUS FOR DEVICE CONTROL

This application claims the benefit of U.S. Provisional Application No. 60/054,047, filed Jul. 18, 1997 and UK Application No. 9707551.9 filed Apr. 15, 1997.

The invention relates to a method and apparatus for device control. In particular, the invention relates to a method for control of one device through another device with which a user can interact, and to apparatus with which the method can be employed.

It is common for a user to use one device with convenient interaction features to control another device with less convenient interaction features. For example, a remote control unit is frequently used for control of a television. The remote control unit is convenient for the user to use: it is portable, while the user interface attached to the television itself is less convenient to use (as it is fixed at the television). Computers are similarly often used to control other equipment, as the user interface of a computer is well understood by the user and in many cases interaction between the equipment and the computer is required anyway (for example, if data is to be passed to or received from the equipment).

A variety of approaches are provided for control of equipment by computers in the different programming options for different computer operating systems. In Microsoft Windows, for example, devices must either conform to a pre-defined generic model (for which an API is provided) under which a set of control commands deemed appropriate to the device class must be understood, or else must be supplied with a device-specific control program, or driver, which must be loaded into the computer before control can take place. In the API case, for example, a TV API might have function calls to turn the TV on or off, change the channel to a specific set of values and set the volume, all televisions being able to offer those and only those controls through the API. In either case, if Microsoft Windows is to be used for control of, say, a fax machine by a personal computer, it is necessary for the functionality of the fax machine to be "known" by the personal computer. User events are sensed by the personal computer and then interpreted in the context of the controls required by the fax machine.

Another example is provided by X-Windows, which is a GUI built (typically) on Unix and can be used for control of other devices. X-Windows recognises a variety of input devices, such as mouse and keyboard. It is adapted to provide applications with events which describe what is happening to those input devices (e.g. right mouse button pressed at co-ordinate 345,678). The application then decides how to interpret this action (e.g. turn TV on). The control program therefore involves both the functionality of the controlled device and user interface features of the controlling device.

Although such control approaches can be very powerful, they are not flexible. Either a discrete control program must be devised for every device combination (or at any rate for any controlled device for a class of controlling device—such as a personal computer running a version of the Windows operating system) or the device's functionality must conform to a predetermined generic model of the device's type. It is therefore desirable to achieve more flexible control methods, in which fully featured control could be achieved without extensive re-work in devising control programs for new devices and maintaining the highest level effectiveness achievable with a given device combination.

The present inventors realised that these goals could be reached through removing the need for the controlling device to have specific knowledge of the controlled device.

Accordingly, the invention provides in a first aspect a method for the control of a controlled device by means of a controlling device, comprising; establishment of a means for transmitting signals between the controlling device and the controlled device; provision by the controlled device of a set of possible parameter choices and information identifying said possible parameter choices and transmission thereof to the controlling device; display at the controlling device of the set of possible parameter choices and of information identifying possible parameter choices to enable user selection of a set of actual parameter choices with a user selection means; transmission of the set of actual parameter choices to the controlled device; and modification of operational parameters of the controlled device in accordance with the set of actual parameter choices; wherein the set of possible parameter choices and set of actual parameter choices are provided in a form independent of the user selection means.

Where the controlled device provides to the controlling device only a set of choices and information relating to those choices, that leaves the controlling device free to display the set of choices and the information relating to them in any way that it chooses, or that is convenient for it. This means that the same approach can be used for interaction between essentially any controlling device and the controlled device. If the controlling device has only limited user interaction capabilities, a very limited user interface for the controlled device can be constructed. However, if the controlling device has rich possibilities for user interaction, these can be exploited to create a rich user interface for the controlled device at the controlling device.

This arrangement divides responsibility for the process of control and device operation ideally between the controlled device and the controlling device. The functionality of the controlled device, and how that functionality may be changed, only needs to be understood by the controlled device instead. The controlling device needs to understand nothing of the functionality of the controlled device, but is instead left to determine how it should display the available parameter choices: this allows the display options to be matched to the capabilities of the controlling device.

In a second aspect the invention provides an information handling device adapted for the function of a controlling device in the method indicated above, the information handling device comprising: means for communication of information with a controlled device; user interface means for displaying information to a user and for returning values derived from a user input; and means for presenting the set of possible parameter choices and associated information received from the controlled device through the user interface means, and for returning the set of actual parameter choices from the user interface means to the controlled device.

In a third aspect, the invention provides a control script to enable provision by a controlled device of a set of possible parameter choices and information identifying said possible parameter choices and transmission thereof to a controlling device, comprising for each parameter the possible parameter choices, a type for that parameter, and user interpretable parameter information.

Specific embodiments of the invention are described below, by way of example, with reference to the accompanying drawings, in which:

FIG. 1 shows a schematic representation of a control arrangement to which the present invention is applicable;

FIG. 2 indicates schematically steps followed in control processes according to aspects of the invention;

A generic implementation is shown schematically in FIGS. 1 and 2 and described in detail below.

Figure 1:
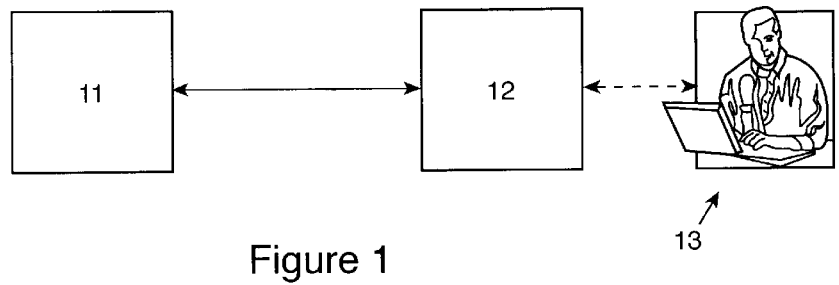

FIG. 1 shows the basic requirements for application of aspects of the present invention. There exists a controlled device 11 that performs a device function in accordance with certain user-determinable parameters. Controlled device 11 could be a household appliance such as a television, a music system, or a washing machine, an office appliance such as a printer or a scanner, another item of machinery or substantially any device capable of external control. There is also a controlling device 12, which acts to provide control information to controlled device 11. Again, controlling device 12 could be a remote controller, a personal computer, or substantially any other device with a user interface. There must also be a mechanism for two-way communication between controlling device 12 and controlled device 11: both a means for exchanging messages between the two devices and a protocol such that meaningful messages can be exchanged—again, substantially any medium and associated protocol can be used. A user 13 interacts with the controlling device 12.

Figure 2:
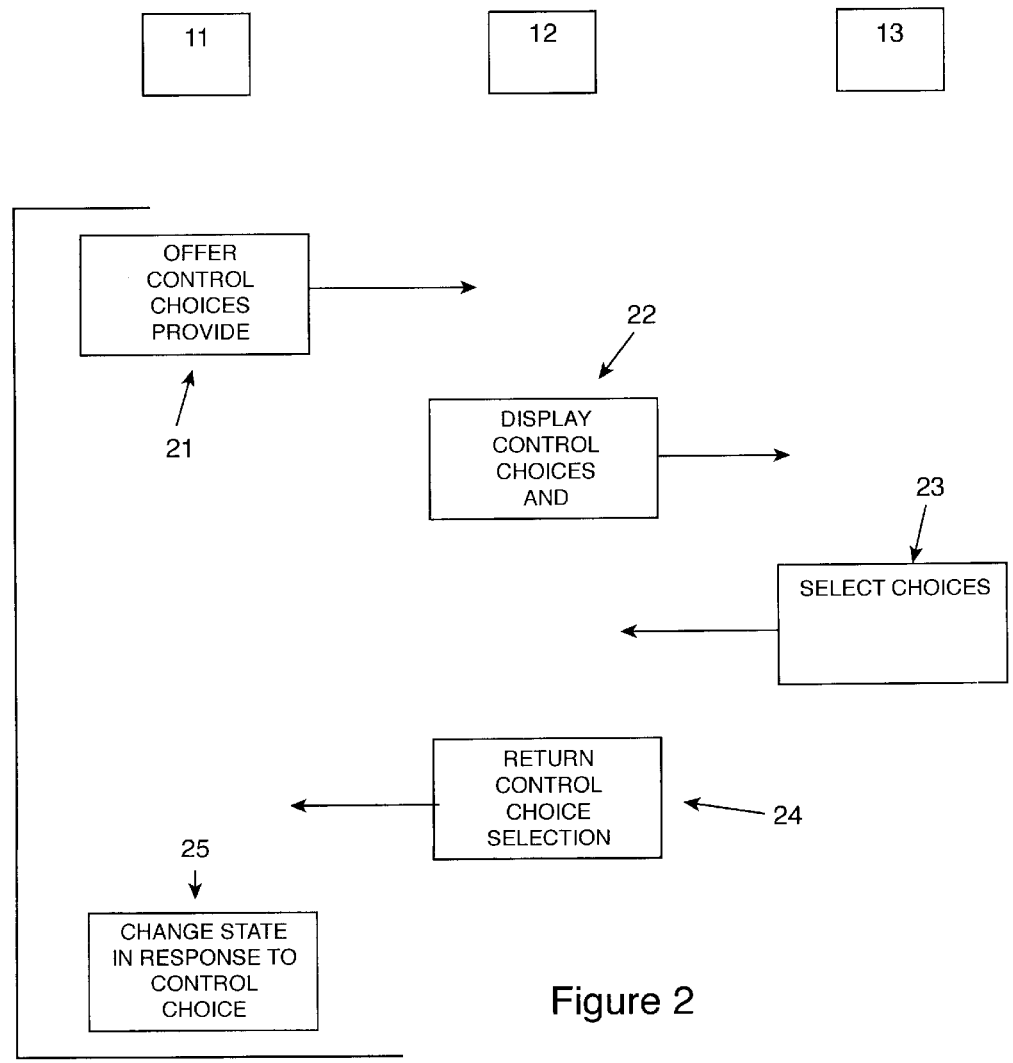

The steps in a control process according to an aspect of the invention are set out in FIG. 2. It is assumed that there is already established a means for transmitting signals conveying messages (in both directions) between the controlling device 12 and the controlled device 11. The user 13 can interact with the user interface of controlling device 12.

Step 21 consists of the provision by the controlled device 11 of a set of possible parameter choices to the controlling device 12. Such choices may be a binary choice such as "ON OR OFF", a selection from a series of values such as "1, 2, 3, 4, 5" or "'Parsley', 'Sage', 'Rosemary' 'Thyme'" a selection from a range such as "an integer value between 1 and 12". Tokens need not be text strings: in appropriate implementations they could be, for example, images or icons. Essentially any defined set of choices is possible for this purpose. There must also be provided information identifying said possible parameter choices. For example, a label such as "Volume" could be provided, with an associated parameter choice of "an integer value between 1 and 12", or a label of "Recording" with an associated parameter choice of "ON OR OFF". This label serves a dual function: it is associated by controlled device 11 with a specific parameter for determining its function, so controlled device 11 is adapted to change its state to reflect a specific choice for that parameter—it is also sufficiently descriptive of the parameter that the user 13, when provided with the label information, will be capable of making an appropriate choice for the associated parameter. It however need have no meaning for controlling device 12—for controlling device 12 the label is merely a label. Controlling device 12 need not be adapted in any way to the function of controlled device 11.

Step 22 consists of the display at the controlling device 12 of the set of possible parameter choices and of information identifying the possible parameter choices. This requires presentation to the user of information identifying each parameter choice available: this may involve simple presentation to the user of the label attached to a given parameter choice, together with an indication of the possible selections a user could make for that parameter choice. For example, taking the parameters discussed in the preceding paragraph, the controlling device may have a display indicating the label "Volume", with a user operable dial or slider next to it showing values of 1 to 12, and a button which can be "pressed" by the user labelled "Recording".

Step 23 is the selection by the user of a set of actual parameter choices. This is done by whatever means is appropriate to the user interface of controlling device 12. Advantageously, this user interface ensures that the user is only able to make a choice for a given parameter that is among those provided by controlled device 11. The user makes selections on the basis of the information provided by controlled device 11 and the user's own knowledge and understanding. Controlling device 12 has no role in the selection of choices for any of these parameters.

Step 24 is the transmission of the set of actual parameter choices made by the user 13 from the controlling device to the controlled device 11. This set of actual parameter choices must be provided in such a way that the controlled device can determine to which parameter each parameter choice relates (for example, by attachment of the appropriate label to each parameter choice).

Step 25 is the modification of operational parameters of the controlled device 11 in accordance with the set of actual parameter choices.

The function of controlling device 12 is thus limited to exchanging information with controlled device 11 and enabling user interaction such that the user can control the controlled device 11, and these functions operate in the same way irrespective of the nature or functionality of the controlled device 11. The controlling device 12 does have control of the mechanisms by which information is displayed to the user and by which the user makes his or her choices: consequently, choices can be made appropriate to the richness of the user interface of controlling device 12.

Control may require repeating of one or more of these steps. Steps 23 to 25 could be repeated over time, as the user decides to change the operation of the controlled device 11. If there is a hierarchical control structure (such that selection of one parameter choice requires the making of another parameter choice), steps 21 to 25 may need repeating as a sequence one or more times before operation of the device function of controlled device 11.

Although the invention is described here in the context of a human user 13, this is not essential to the invention in its broadest aspects. "User" 13 may be replaced by another device, or even controlling device 12 in another aspect of its operation (for example, a separate program). All that is required of user 13 is the capacity to make a selection for the parameters indicated by controlled device 11 according to the information presented by controlled device 11. This could be achieved by a program adapted to recognise labels attached to parameters, or information made in those labels, and to return a parameter choice from the selection available based on those labels. It may be necessary for this "user" 13 to have more or less detailed knowledge of the function of controlled device 11, but communication between controlling device 12 and controlled device 11 still does not depend on the function of controlled device 11, and neither does presentation of parameter choices and associated information by controlling device 12 to user 13 (even if user 13 is a program internal to controlling device 12!).

A useful and practical instance of a non-human user is a control program which comprises a predetermined set of preferred user choices for a particular virtual control panel. The effect of the control program is that whenever controlling device 12 "sees" that virtual control panel, the program will run so as to return these preferred choices. Such a control program is analagous to a macro of a conventional word processing or spreadsheet program.

As indicated above, the present invention has very general application. A particularly useful application is for controlling device 12 to be adapted as a universal remote controller, provided with a well featured user interface comprising a display and user means to identify choices (one or more of buttons, a touch screen with a stylus, a keypad etc.) and a communication means (for example an infra-red tranceiver) and means to interpret messages received and provide information as messages for transmission through the communication means. Such a device could be, say, a handheld controller useful for interacting with substantially any controllable device adapted to communicate with it, as the controlling device itself need have no knowledge of, or adaption to, the function of the controlled device. This offers a highly versatile and relatively low cost solution for remote control—so, for example, the television, music centre (and even windows and washing machine) could be controlled from the same controller, which itself has no adaption to the function of any of these devices.

A particular application of the invention will now be described in detail which is in accordance with the principles of operation indicated above. This application is in the context of the JetSend architecture of Hewlett-Packard Company.

JetSend is an architecture according to which devices transfer information directly without need for intermediaries where network considerations allow, information being transferred according to a common protocol whatever it relates to. Devices have no need to have knowledge of the functionality of other devices. In the context of a computer network, this means that, say, a scanner and a printer can communicate without the mediation of a personal computer, and there is no requirement for a driver to be loaded on one device to enable interaction with another device.

Figure 3:
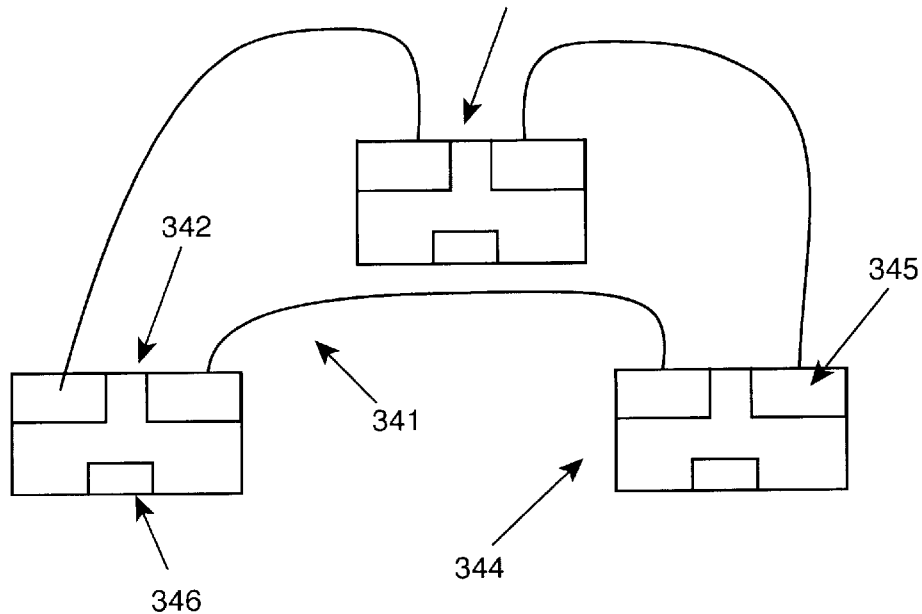
FIG. 3 shows a device environment for which aspects of the invention can be employed.

FIG. 3 illustrates the environment in which JetSend devices operate. A network 341 of some kind (in the broadest sense of means to enable communication between devices) exists between devices such as a printer 342, a personal computer 343, and a scanner 344. Each of these devices must possess a processor 346 of some kind, together of course with a connection means 345 to allow interface with the network 341. It is necessary in this implementation for each of the devices to have some measure of processing capacity, as such capacity is necessary for processes integral to JetSend.

The JetSend architecture can be employed effectively for communication of information between one device and another. This has been discussed in other applications of Hewlett-Packard Company, in particular British Patent Application No. 9707551.9 filed on Apr. 15, 1997 and entitled "Method of Passing Information" and U.S. patent application Ser. No. 60/054,047 filed on Jul. 18, 1997 and entitled "HP JetSend Protocol Specification" and subsequent applications in the United States of America and elsewhere (entitled "Method and Apparatus for Device Interaction by Protocol" and "Method and Apparatus for Device Interaction by Format") claiming priority therefrom, the contents of these applications being incorporated by reference herein. As is indicated below, the present invention can readily be applied to the JetSend architecture and protocols to achieve particularly effective control of one device by another. The basic principles and elements of the JetSend architecture are discussed briefly below, and then the application of the present invention in the context of relevant specific elements of the JetSend architecture is discussed in more detail below.

The basis for communication between devices in JetSend is the surface interaction model. A surface is a representation of some aspect of internal state possessed by a device. The representation is universal, and is not determined by the functions performed by the device. A surface in this context is analagous to the surface provided by a physical object (such as a telephone, or a brick). The way in which the object operates is determined by how the "functional" parts of the object connect to the surface, but the surface itself can be described in a simple universal way, irrespective of function, and provides the medium through which the object is connectable to other physical objects in the world—the nature of the connection between physical objects being independent of any device function. In JetSend, the surface is the fundamental unit of information exchange, and images, documents, status messages, device labels and the like are all transferred through use of one or more surfaces. A surface consists of a number of elements: description, content, properties and class—these will be discussed further below.

The surface interaction model defines mechanisms for creating, sharing, modifying and deleting surfaces. Only a fixed number of generic operations can be performed on a surface, using the messages defined by the JetSend Interaction Protocol (JIP), which will be discussed further below.

The original copy of a surface is here termed an expression. There is one expression involved in any surface interaction. Devices that have information to share with other devices create one or more expressions to represent that information.

Surface expressions can be impressed on other devices. This creates an impression of that surface—also known as sharing the surface. Impressions are copies of other device's expressions, and connections are maintained between the devices to ensure that impressions are up-to-date with their corresponding expression. Typically, two devices will share several surfaces at a given time; surfaces that represent the elements of a job, status information from each device, security information, and so forth.

Figure 4:
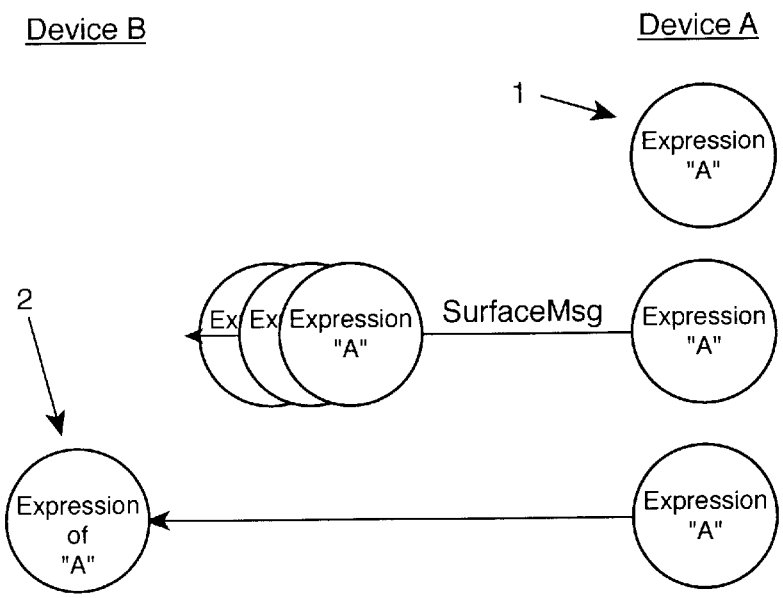
FIG. 4 shows the creation of a surface impression on one device from the surface expression of another.

FIG. 4 shows how an expression 1 on one device (Device A) is shared with another device (Device B), thereby creating a new impression 2. The same expression can be impressed multiple times on multiple devices. This creates multiple impressions of the same surface expression. When the expression changes, or is deleted, all impressions will be notified.

A surface comprises a description of the surface, and the content contained within the surface. The distinction is fundamental to JetSend and of significance in aspects of the present invention.

The surface description establishes the full range of possible forms in which information associated with a surface (this information being provided as surface content data) can be shared with another device. The description consists of a data format hierarchy, and can be represented as a tree structure with a number of nodes each representing a definable aspect of the data format (referred to as an attribute, and discussed in greater detail elsewhere). A specific data format for the information associated with the surface is a path through this tree structure from a root node down to a terminal node (a leaf node of the tree). Such specific paths are reached through a process of negotiation. The process of negotiation, in this context, comprises the surface owner sharing the surface description, or a part of the surface description, with another device. The other device then chooses the options it prefers (generally such options will be selected so that the receiving device can use its own functionality in the richest manner available given the choices offered, but this is essentially a matter for the designer of any given device) and this process continues until a specific path, and thus a specific data format, is chosen.

The surface content is the information associated with the surface, and is provided in a format determined by negotiation as indicated above. The content data can be provided in all the formats indicated by the data format hierarchy embodied in the surface description, but for a given surface interaction will generally only be provided in one of the formats available. Content data need not exist prior to completion of the negotiation: for some or all of the choices in the data format hierarchy the data may only be generated after the format choice is known. Alternatively, for some choices the content data may be provided directly together with the description identifying a particular point in the data format hierarchy as a part of the negotiation process (so no separate step of provision of content is required for that format choice). This is termed providing content data in-line. These issues are discussed in the context of control information at a later point.

A surface description can also contain references to other surfaces. These surfaces are known as sub-surfaces (or child surfaces) and they must be requested separately from the owner of the parent surface. Each sub-surface contain its own description and content, independent of its parent.

A surface reference, or a surface name, is simply an ASCII string—like a URL. All surfaces are identified by their name, and may belong to a particular class. All surfaces possess a class. Class is a property indicating the purpose for which the surface is used: in the present implementation, each surface must have one, and only one, class. Specific rules exist, or may be devised, for use of surfaces of a particular class. Classes are used particularly in the context of specific policies. Where a particular class of surface plays a fundamental role in execution of a given policy, surfaces of that class are termed "well-known surfaces" for that policy. Policies applicable to control information are discussed further below.

A policy, or interaction policy, is a set of conventions for use of generic surface interactions to achieve a particular task. The advantage of using a policy for a particular task is that it enables all JetSend devices adapted to perform, or require another device to perform, the particular task to interact successfully and in a predictable way with other devices in order to achieve that particular task. This does not exclude the possibility of, for example, a pair of devices adapted to perform such a task in a different way not open to other JetSend devices using a different class of surface to do so. However, it is desirable that such devices still support the relevant JetSend policy so that they can achieve this task with other JetSend devices too.

The available set of surface interactions is discussed in greater detail below in the context of control information.

E-material, a term coined as a shortened version of "electronic material", is the form taken by information through which surfaces are expressed and shared. It comprises description and content. The description indicates a hierarchy of choices of format in which the associated content data can be provided. The content is the data associated with the surface itself. The description indicates the ways in which the data can be presented, whereas the content is the information itself, presented in a form chosen to be suitable for the device sending it and the device receiving it. The existence of this choice is key to the concept of e-material, and the mechanism by which this choice is made is discussed further below.

E-material is not a file format. E-material defines the format of the data that devices exchange, but it does not define how devices process or store that data. Devices that consume e-material do so on a manner that is specific to that device. For example, a receiving device such as a printer will process e-material differently than a receiving device such as a PC.

The most fundamental division of e-material types is into encodings. An encoding is an e-material representation of a fundamental form in which information can be presented in the world. For control applications, there is a specific encoding for e-material used in a control interaction.

An attribute is a feature of a piece of e-material that is defined in the e-material description (or defined for the piece of e-material after the completion of the negotiation process). Essentially, each node in the data format hierarchy provided in the e-material description represents an attribute. From this equivalence between nodes and attributes there is derived the concept of an "attribute level": essentially, an attribute level is shared by all nodes equally distant from the root node of the data format hierarchy. Attributes comprise a quality that can be provided for the e-material content, and a choice or value for that quality, and the choice or value may itself represent a further attribute (a quality requiring a choice or value). The quality itself is represented by an attribute name (sometimes shortened to "attribute" in this description), whereas the choice or value is represented by an "attribute value" (sometimes shortened to value in this description): consequently the nodes of the data format hierarchy can be considered as providing a specific quality and either a specific choice or a range of choices for that quality. Attribute names are keywords, for which the available values or choices are predefined, so the options offered in a given surface description for a given keyword must be some selection from these predefined choices. For different encodings, certain attributes will be required, others will be optional, and others not used at all.

E-material thus expresses the encoding choices of a surface with a number of attribute-value pairs arranged in a hierarchy. All surface descriptions contain the attribute vEncoding (all attribute and value names are prefixed with a lower case v). As indicated above, this determines the overall encoding of the surface—for example, if it is control information, vEncoding will be vControl. Each encoding has a number of standard attribute-value pairs associated with it. Some of these attributes can also contain choices. In fact, the owner of the surface can express quite complex choices by adding options to many of the attributes in the surface description.

Figure 5:
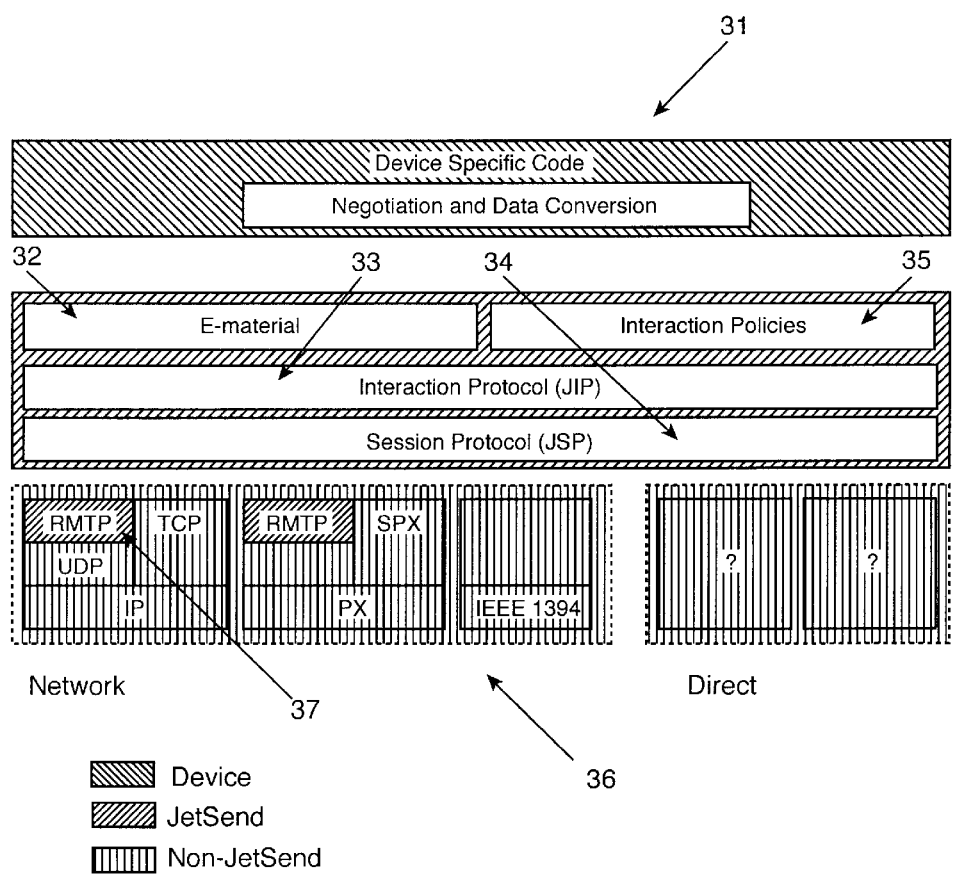
FIG. 5 shows the components of the JetSend architecture and their logical relationship to each other.

There are three primary areas of functionality that make up JetSend for a device: the transports in the device, the JetSend protocols themselves, and device specific code. FIG. 5 identifies the components of the JetSend architecture and their logical relationships to each other. This is followed by an overview of each of the components. Details for each component are provided at a later point It should be noted that FIG. 5 is not an implementation diagram. It shows the relationship between the protocol, not between software components. Actual implementations can have similar components, or combine the implementation of multiple protocols into a single module.

The JetSend architecture is applicable independent of transport. JetSend devices can address each other directly over any bi-directional transport 36 using unique addressing. It is necessary for the transport to be reliable: therefore for an unreliable transport such as UDP, a further protocol layer must be added to make transmissions over the transport reliable (a further protocol here termed Reliable Message Transport Protocol (RMTP) 37 is used for this purpose). Possible transports include TCP/IP, SPX/IPX, IrDA, IEEE1284, IEEE1394, and others. A device can implement one or more transports, allowing it to communicate with other devices using those same transports.

Communication between JetSend appliances occurs using a number of layered protocols, as can be seen from FIG. 5. These layers are similar to most networking systems, where each protocol layer communicates with the equivalent layer in the other device. The layers that comprise the JetSend protocol are the Interaction Policies 35, the Interaction Protocol 33 and the Session Protocol 34. The RMTP Protocol 37 is not strictly a part of JetSend, but rather a protocol to allow use of transport protocols which are not both reliable and ordered.

The policies have been discussed briefly above and will be discussed further in the context of control, as will be the interaction protocol which contains messages for requesting and transferring surface descriptions, transferring content data for a surface, and updating surfaces. In conjunction with E-material, this provides the mechanism for negotiating data types between devices.

The session protocol defines messages for setting up sessions and channels between two devices. A session manages the establishment and termination of data transport between the two JetSend entities. It can create logical channels within that context for communications. All these interactions take place over whatever transport is provided by the transport layer below. JSP is also used in gateways between JetSend and non-JetSend devices.

When a channel uses an unreliable transport such as UDP, RMTP provides the reliability service for that channel. RMTP is a reliable, sequenced delivery protocol. RMTP is not transport specific, and a single instance of it can maintain connections through all of the transport stacks simultaneously.

The Device Code is the term used for the logic needed to tie the JetSend protocols into an actual device. The Device Code 31 in FIG. 5 can exist in any device that is capable of either producing or consuming information. Typical producing devices are scanners and PC applications. Typical consumers are printers and PC viewers. A device must be able to convert between the device specific information/data formats and the e-material used by the JetSend protocols.

For further discussion of transport protocols, the reader is directed to U.S. patent application Ser. No. 60/054,047 filed on Jul. 18, 1997 and entitled "HP JetSend Protocol Specification" and subsequent applications in the United States of America and elsewhere (entitled "Method and Apparatus for Device Interaction by Protocol" and "Method and Apparatus for Device Interaction by Format") claiming priority therefrom. The skilled man will appreciate how appropriate device code can be generated for any specific device according to the architecture and operation of the device itself.

The JetSend Interaction Protocol (JIP) and the messages forming the protocol will now be described. Use of the ISP by the JIP to allow appliances to exchange and share information will also be discussed generally and with reference to exchange of control information.

The JIP is made up of a small number of messages that allow any number of devices to share pieces of information termed surfaces according to the surface exchange model. In any interaction one device owns the surface. The owner's copy is referred to as the expression of the surface, and the owner itself is known as the expressive device. All other copies of the surface are referred to as impressions, and the devices holding them are called impressive devices. The messages provided by the JIP allow the expressive device to create and destroy expressions, the impressive devices to destroy impressions they hold, and any device to modify the original surface expression.

In order to implement the concept of surfaces, expressions, impressions and so forth, a list of messages has been created. It is through the use of these messages that all "surface-interaction" takes place. The following messages make up the Interaction Protocol:

SurfaceMsg (Impress)—creates new impressions of surfaces on target device, also used to reject requests for impressions.

SurfaceDeleteMsg (Delete)—notifies impressive devices that the expressive device has deleted the original expression SurfaceReleaseMsg (Unimpress)—notifies the expressive device that an impressive device has deleted an impression SurfaceRequestMsg (Surface Request)—allows a device to request an impression of a named surface DescriptionRequestMsg (Description Request)—allows a device to request the description for a surface it has an impression of DescriptionReplyMsg (Description Reply)—transmits the description for an impression in response to a description request ContentRequestMsg (Content Request)—allows an impressive device to request some content data from the expressive device ContentReplyMsg (Content Data)—transmits some content data from the expressive device to an impressive device in response to a content request: there may be a sequence of these messages in response to a content request, and this message is also used to reject a content request SurfaceChangeMsg (Change)—notifies a device that the information has changed (ie by expressive devices to notify impressive devices of a change, and by impressive devices to request a change of an expression—also rejections of these requests).

A surface has a number of attributes. They are a name, an identifier, a class, a set of properties, a description, some content data and a version. The name is a NULL terminated ASCII string. The identifier is allocated to each surface and uniquely identifies it in the JIP. The class is used to determine the purpose of the surface. The set of properties controls what JIP messages an expressive device will respond to. The description contains a description of the formats the data is available in, or which the expressive device is willing to provide. The content data contains the actual bytes of the information itself. The version is used by the change mechanism so expressive and impressive devices know which version of a surface a change relates to.

A typical interaction proceeds as follows. First, the device with information to transfer, which will be the expressive device, creates an expression. To do this it needs to create a name, allocate a unique identifier, create a set of properties, and create a description. At this point it does not need to create any content data, although it must be able to produce the content described in the surface description.

Next, the expressive device uses these attributes and attempts to create impressions of this surface by sending a SurfaceMsg to the target device or devices. Note that such SurfaceMsgs may be sent out unsolicited or they may be sent in response to an earlier SurfaceRequestMsg received from another device. Also note that in order to create an impression using the SurfaceMsg, the expressive device must have a "target surface" on which to "impress" the expression. When the SurfaceMsg is in response to an earlier SurfaceRequestMsg, this target-surface identifier can be found in the SurfaceRequestMsg. If, however, the expressive device is creating an unsolicited impression, the target-surface identifier can be that of an existing impression, in which case the expression must already exist, or it may be set to the "default target" identifier.

The default target identifier is sometimes referred too as the "work surface". The existence of such a default is important for proper implementation of JIP. Otherwise, there is a bootstrap problem when an expressive device is first sending a message to an impressive device: the expressive device does not know where to create an impression on the impressive device (of which it has no knowledge at this point), and the impressive device cannot conveniently tell the expressive device (without sending some kind of global message) as it is not aware that the expressive device wishes to create an impression. The solution is the existence for all devices accepting impressions of a default or work surface with a default target identifier (in this implementation the default target identifier has been set at 1). This enables any expressive device to create an impression on an impressive device by setting the target identifier field to 1. The impressive device can then enter into communication with the expressive device (for example, with a SurfaceRequestMsg message requesting impressions to a new target surface).

Figure 6A:
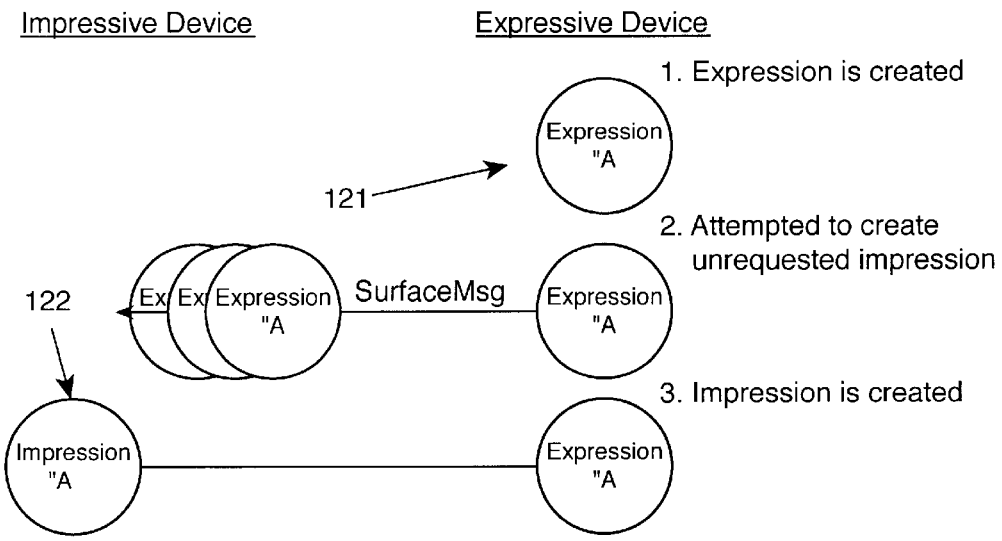
FIGS. 6a to 6j show the use of messages of the JetSend interaction protocol in exchange of information between appliances.
Figure 6B:
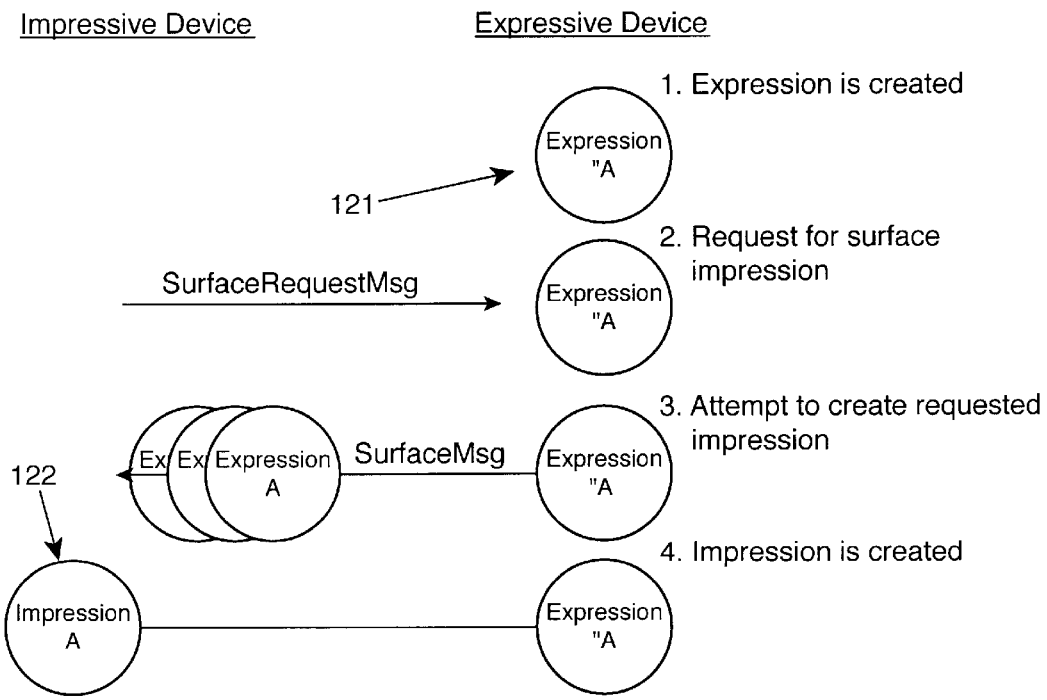
Figure 6C:
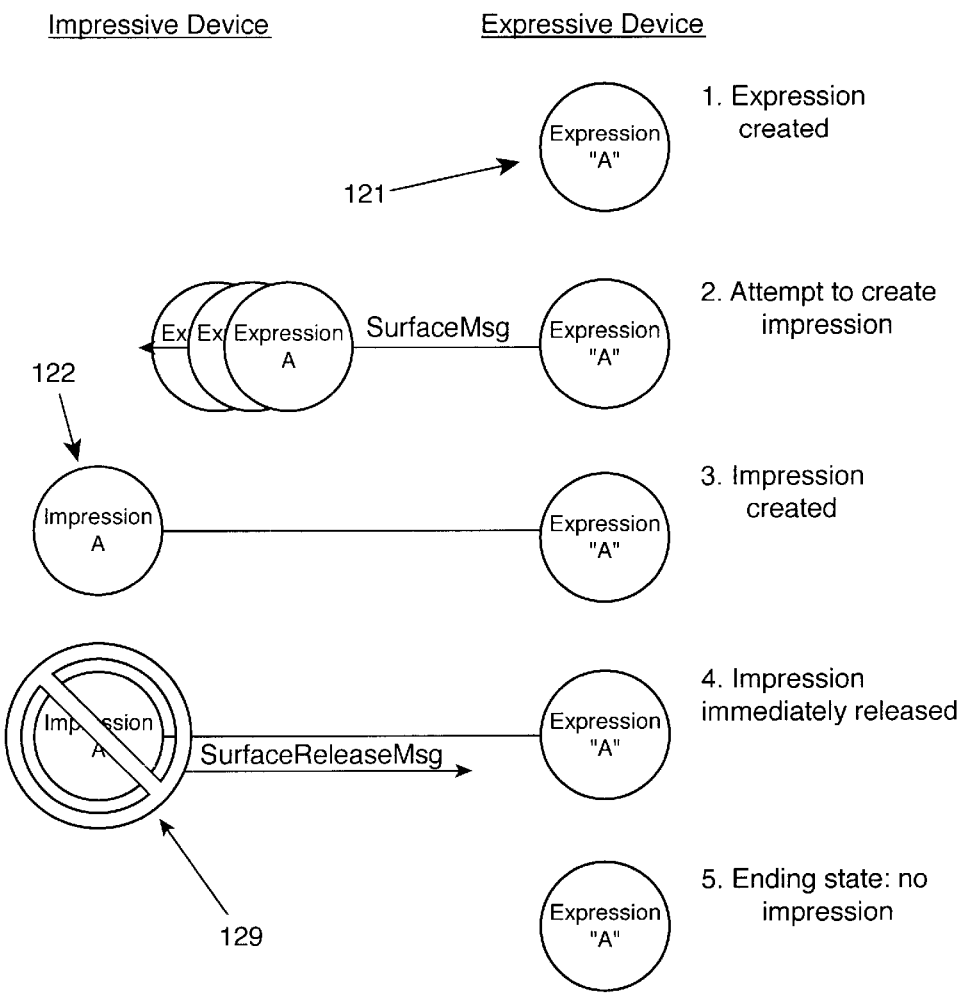
Figure 6D:
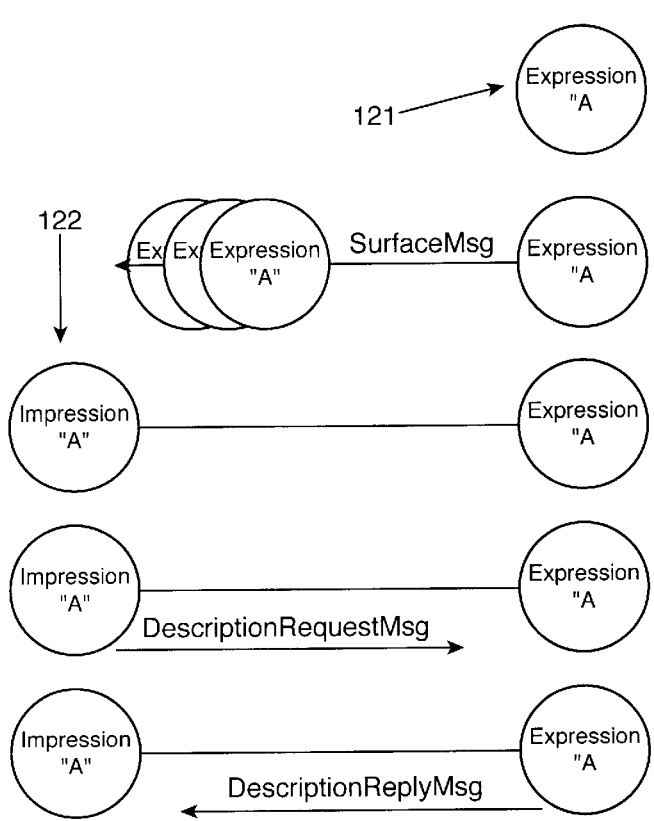
Figure 6E:
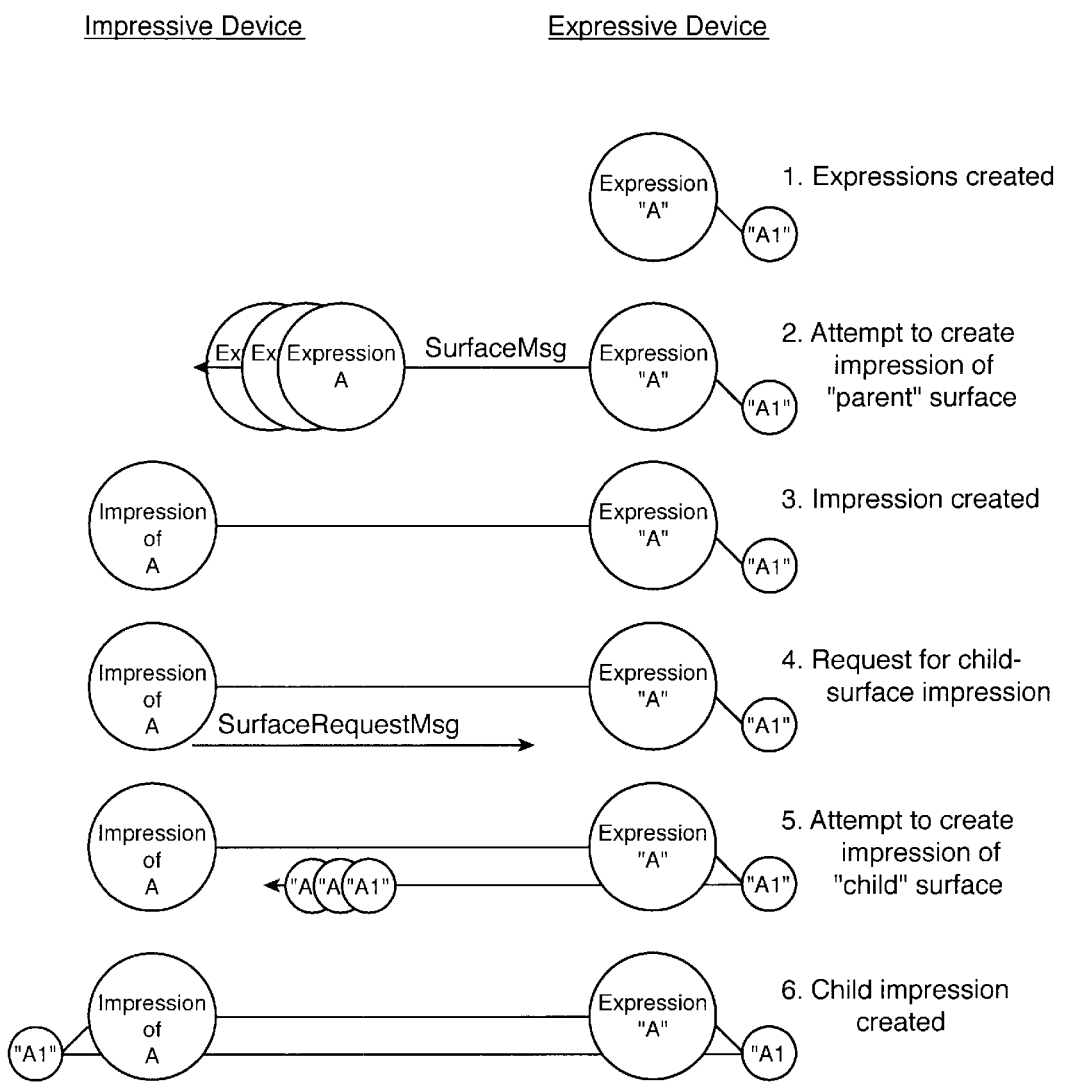
Figure 6F:
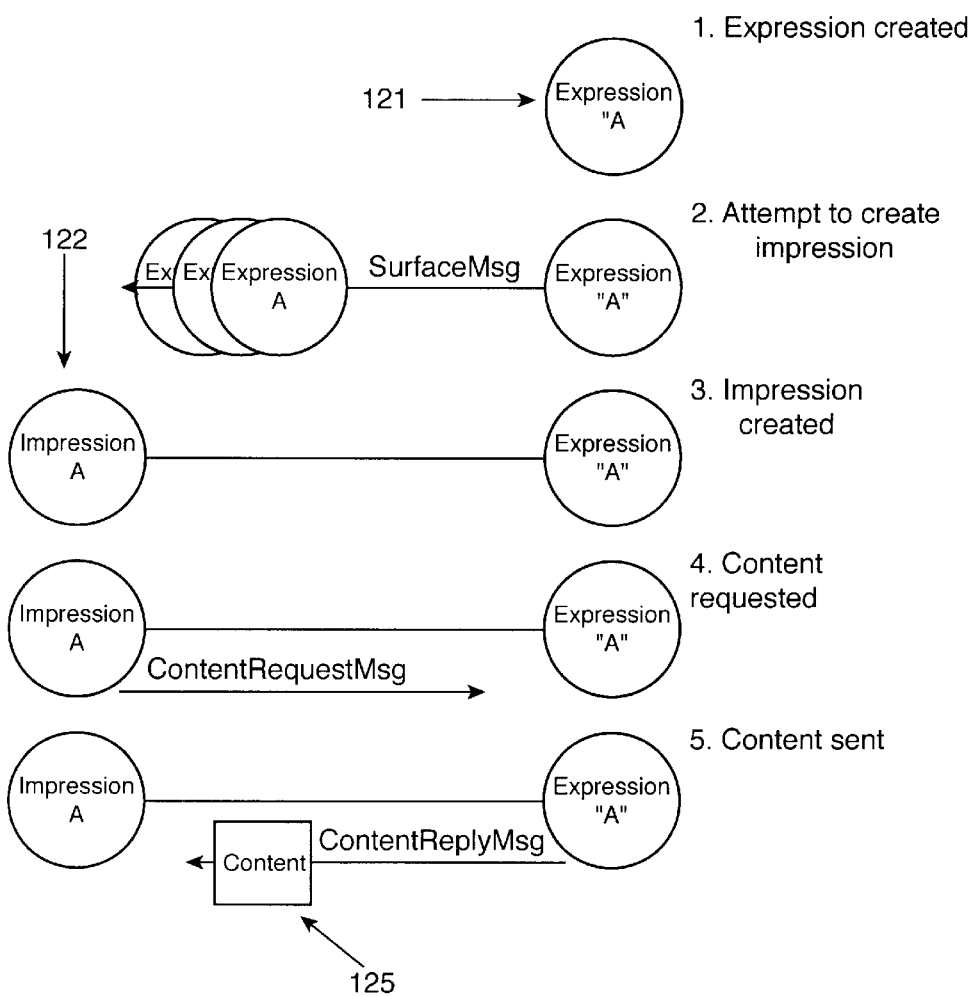

A series of examples illustrating use of the messages of the JIP is provided below, with reference to FIGS. 6a to 6k. FIG. 6a is essentially similar to FIG. 4, but is provided as FIG. 6a for convenience.

EXAMPLE 1

FIG. 6a

An expressive device wishes to create an unrequested impression. First, a surface expression 121 is created. This is then impressed on the impressive device with SurfaceMsg and an impression 122 of the surface exists at the impressive device.

EXAMPLE 2

FIG. 6b

An expressive device creates a surface expression for information that it wishes to exchange with other appliances. In this example, the expression already exists before it is requested, but this is not necessarily the case (for example, child surfaces may not in some cases be created until they are actually requested). The expressive device then receives a request for a surface impression in a SurfaceRequestMsg from the impressive device, and in response attempts to create the impression with a SurfaceMsg. The end result is as in Example 1, with an impression 122 created at the impressive device.

EXAMPLE 3

FIG. 6c

An expressive device creates a surface expression and attempts to create an unrequested impression on an impressive device, as in Example 1. The impression 122 is created, but is then immediately released 129 with a SurfaceReleaseMsg from the impressive device to the expressive device. The end state is with an expression 121 of the surface at the expressive device, but with no impression of the surface at the impressive device.

EXAMPLE 4

FIG. 6d

As in Example 1, an unrequested impression 122 is successfully impressed on the impressive device. The impressive device then can use the description in the impression 122 to determine what action to take next In some cases, such as that in this example, the surface description contained in the original SurfaceMsg is not complete. The impressive device can then request more information from the expressive device with a DescriptionRequestMsg message. The expressive device replies to the DescriptionRequestMsg with a DescriptionReplyMsg, which contains the further surface description.

EXAMPLE 5

FIG. 6e

A surface description may contain reference to sub-surfaces, or child-surfaces, of the top-level surface (for example e-material encoded as an association will in practice always contain child surfaces. Example 5 relates to a surface A which has a child surface A1. An expression 121, 123 of each surface is provided at the expressive device (alternatively, only an expression 121 of surface A may be provided at this point). Surface A is then impressed on the impressive device with a SurfaceMsg. The impressive device may then request an impression of the child surface A1 from the expressive device with a SurfaceRequestMsg. This request can be rejected, or accepted, in which latter case the expressive device sends a further SurfaceMsg (after first creating an expression of child surface A1 if such an expression does not already exist). The end state is with an expression 121 of surface A and an expression 123 of child surface A1 at the expressive device, and corresponding impressions 122, 124 of surface A and child surface A1 at the impressive device.

EXAMPLE 6

FIG. 6f

Once an impression of a surface is provided at an impressive device, the impressive device may request content with a ContentRequestMsg. On receiving a ContentRequestMsg, the expressive device may reject the request or provide content 125 in the format requested. This content may be sent as a ContentReplyMsg message (as here), a series of ContentReplyMsg messages, or through another means such as a stream.

EXAMPLE 7

FIG. 6g

Figure 6G:
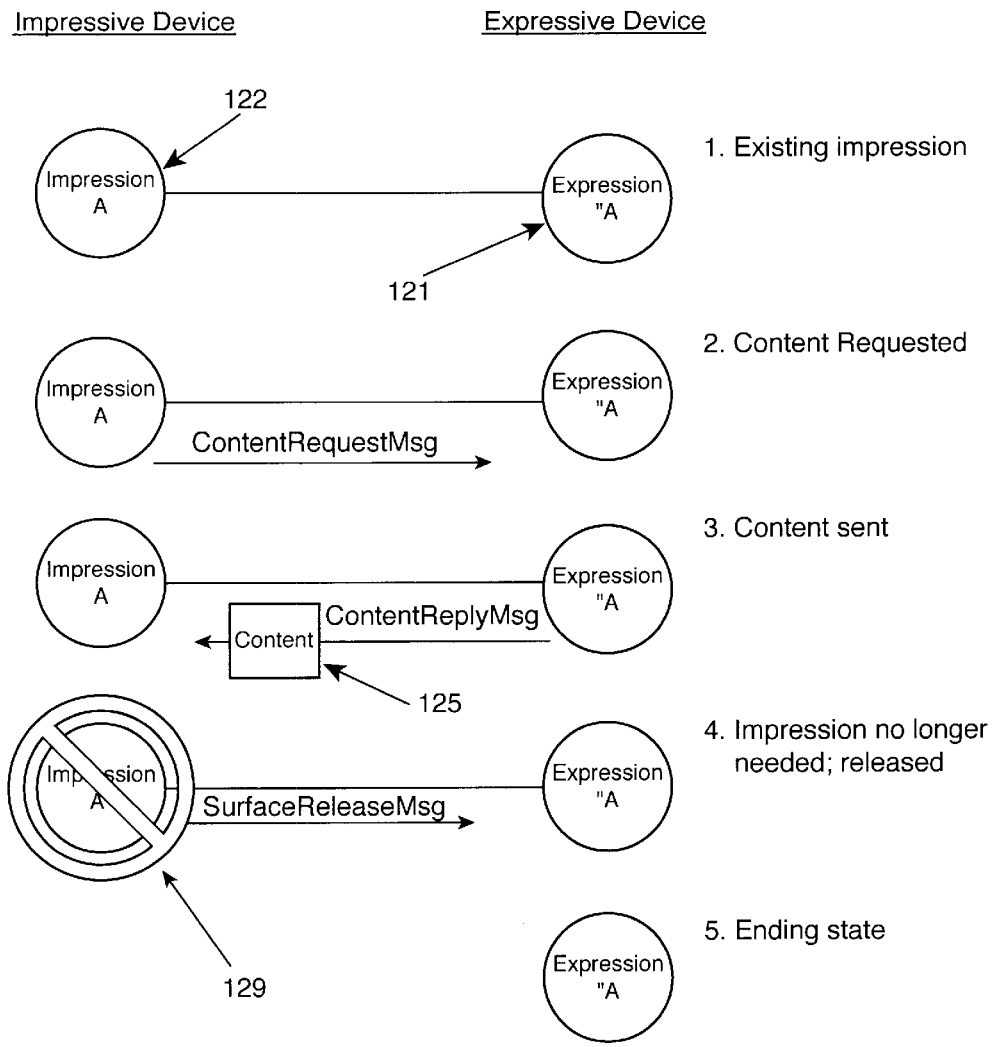
Figure 6H:
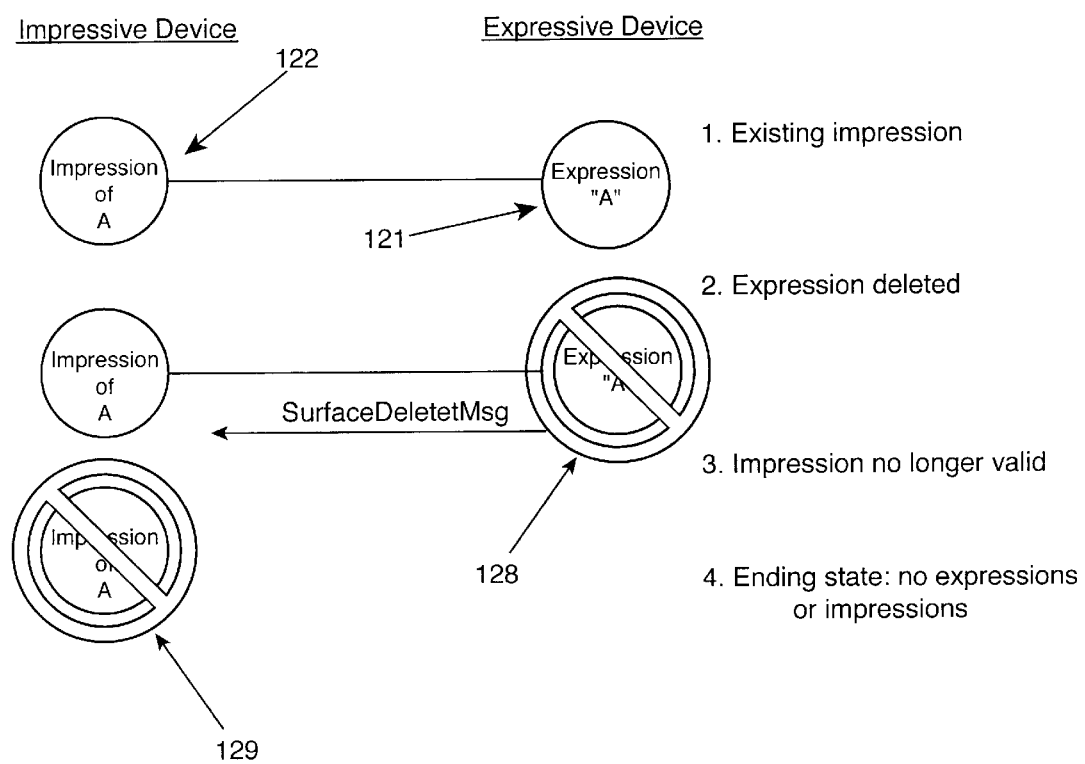

When an impressive device decides that it no longer needs an impression (for example, it is a printer, and it has confirmed that the surface represents a document which it has now successfully printed), it can release the impression by sending a SurfaceReleaseMsg to the expressive device. This situation is shown in FIG. 6g, which follows on from the situation of Example 6: after content has been requested by the impressive device and received, a SurfaceReleaseMsg is sent back to the expressive device to tell the expressive device that the impression is being "unimpressed". The expressive device will then ignore any subsequent messages that relate to the unimpressed surface.

EXAMPLE 8

FIG. 6h

An expressive device can itself delete an expression 128. It does this by sending a SurfaceDeleteMsg to all impressive devices which have an impression 122 of the original expression 121: the message indicates that the expression has been deleted, and the expressing device will then ignore any messages relating to the deleted expression surface.

EXAMPLE 9

FIG. 6i

Figure 6I:
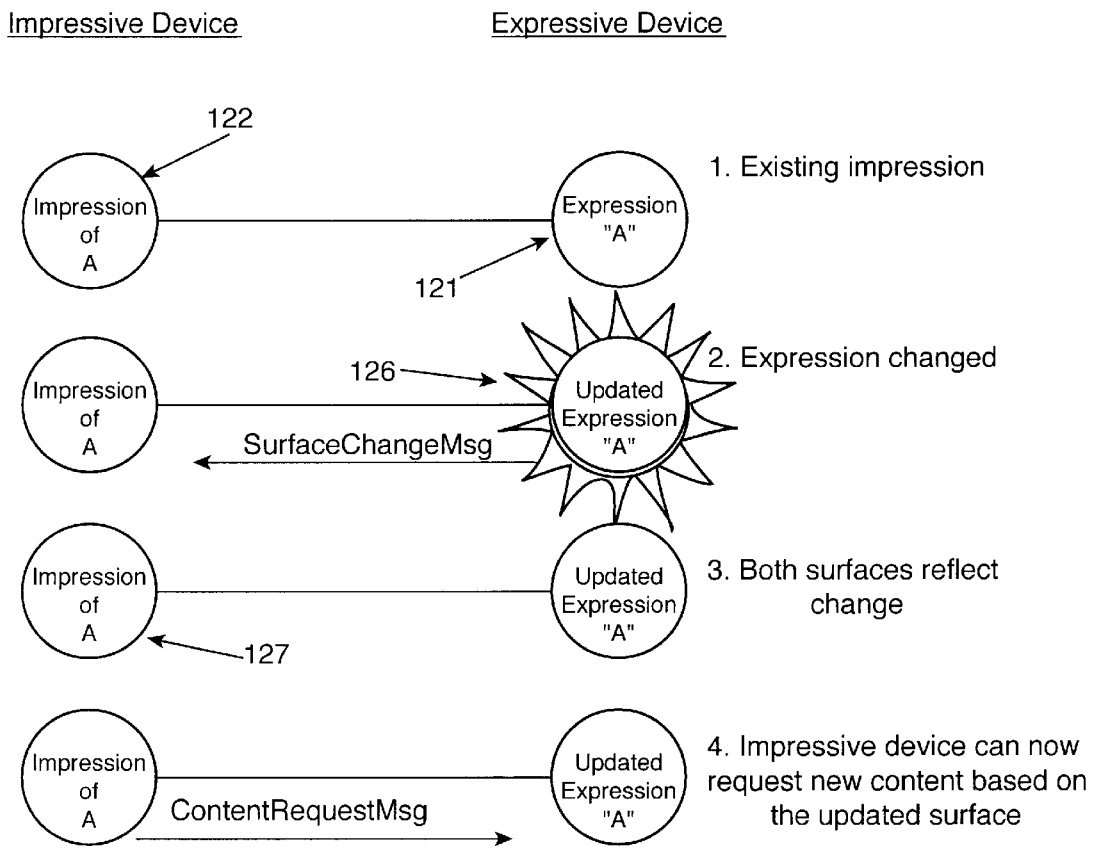
Figure 6J:
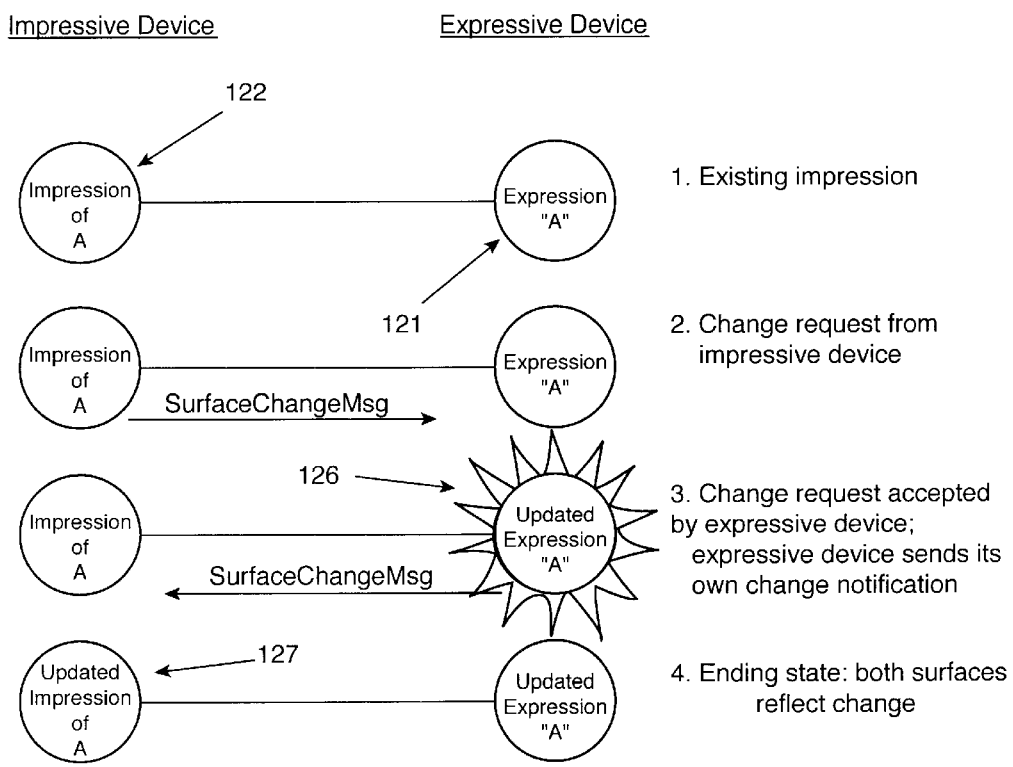

The properties of an expression surface may be set so that the impressive device may or may not be able to change the expression surface (the expressive device can always do this). FIG. 6i shows a change of expression surface 126 by the expressive device. The change of expression surface is reflected by the sending of a SurfaceChangeMsg message from the expressive device to all impressive devices to indicate that there has been a change to the original expression. This will be followed, typically, by new content requests, and possibly even new description requests.

EXAMPLE 10

FIG. 6j

In this example, the impressive device requests a change to the original expression. Again, this is done by means of a SurfaceChangeMsg. This can be either allowed or rejected by the expressive device. If the change is accepted, the expressive device sends a further SurfaceChangeMsg to all impressive devices confirming the change to the requesting impressive device and notifying the remaining impressive devices. If the change is rejected, the expressive device notifies the requesting impressive device that the request failed.

Where a requesting impressive device has successfully requested a change to the expression, it will generally not need to request updated content (though other impressive devices may well need to do so). This is because the impressive device will normally be able to update its own content based on the description change that it asked of the expressive device.

The JIP runs over the JetSend Session Protocol (JSP). As discussed above, the JSP manages all aspects of a session between two devices including creating and deleting sessions as well as deciding when a session has become unusable. The JSP also provides access to the basic addressing, reliable message transport protocols, and any other transport protocols used by the JIP. As indicated above, JSP is discussed in detail elsewhere in other documents incorporated by reference or otherwise publicly available. The skilled man will also understand the transport requirements for a protocol of this type.

Each message of the JetSend Interaction Protocol will now be specified in further detail SurfaceMsg (Impress)

This message is used in three situations: first to initiate a transfer of a surface from the expressive device to another device. Secondly it is used as the response to a SurfaceRequestMsg from another device. Thirdly it is used to reject a SurfaceMsg from an expressive device. A status field is set to indicate which interpretation is to be used.

When this message is used either to initiate a surface transfer or as a response to a surface request, the sending device creates an entry in its surface table, so the impressive device can be notified of any changes.

On receipt of the message, if the destination chooses to accept the impression, it creates an entry in its surface table associating the impression with the expression. This allows it to notify the expressive device subsequently of when it wants to request changes to the surface or when it has finished with it. If the destination chooses not to accept the impression, then it should send back a release message to reject it and not create a table entry. Any subsequent messages relating to the "impression" should then be ignored.

When a sending device receives a release message for an impression it should delete the entry relating to the impression from its table. This ensures that the device which released the impression will not receive any messages related to the impression.

There is a short period between the sending of an impression and the receipt of a release message rejecting it. During this period the expressive device may consider the impression to exist. This will not cause any practical problem, as the issue will be resolved at the receiving end: the "impressing device" is required to ignore messages relating to impressions which it has not accepted, or which it no longer has.

The message provides a source surface identifier: this is an identifier allocated by the expressive device to the surface which is unique for the time between when the first impression is created and the last impression is unimpressed. This identifier is used by the protocol to identify a surface uniquely. The values 0 and 1 are reserved: 0 meaning a NULL surface and 1 being used to designate the "default target" surface expression (used for the work surface, as discussed above).

Also provided is the source surface class: this is the class of the source surface. Class is used to determine the use of the surface. The use of each class is addressed further below in the context of control. It is possible that devices will not be able to handle specific classes of surface: such devices may be configured either to ignore all such surfaces or to treat all surfaces of that class as surfaces of a different class which the device is configured to handle.

The protocol maintains a version number for each surface in use, also identifed in the message. This is updated each time the expressive device changes the surface.

The properties of the surface being impressed are also identified. The values for this field and their associated meanings are set out in Table 1 below.

TABLE 1

Properties of surface impressed with SurfaceMsg

| Value | Meaning |
|---|---|
| 1 | The expressive device will respond to a SurfaceMsg on this surface |
| 2 | The expressive device will accept a SurfaceChangeMsg from an impressive device |

This could be extended in other implementations by adding a value of 3, for which the expressive device will both respond to a SurfaceMsg and accept a SurfaceChangeMsg.

Also provided is a field indicating the surface identifier for the target surface. If this value is set to 1, then the target is assumed to be the default target surface, or work surface, of the destination. Otherwise, this field must contain the surface identifier from an earlier impression of a target surface.

A status field identifies the status of this SurfaceMsg. The following values are defined:

TABLE 2

Defined values for SurfaceMsg status

| Value | Meaning |
|---|---|
| 0 | This is an unsolicited SurfaceMsg |
| 1 | This is an impress in response to a SurfaceRequestMsg. The request identifier field is set to the corresponding request identifier |
| 2 | This is a rejection of a previous SurfaceRequestMsg. The request identifier field is set to the corresponding request identifier |

There is also a request identifier field: for a SurfaceMsg which is a result of a previous SurfaceRequestMsg, this field will be set to the request identifier contained in the corresponding surface SurfaceRequestMsg. For all other situations this field should be set to 0.

Also provided is an impress identifier field: this is a unique identifier that is allocated by the expressive device. It can be used to distinguish between different impressions of the same surface. Note that this identifier need only be unique for each impression of a surface. Impressions of other surfaces may use the same identifier. Thus, while expression identifiers are unique across all local surfaces, an impress identifier need only be unique within the set of impressions related to a specific local surface.

A further field is the target address: the target address is the Session Protocol address of the target device. Impress operations always have a target device and a target surface. In most transactions only a source and a target are involved. However the protocol allows one device to impress an impression from a second device onto an impression from a third device. In this case the third device can only be identified by its JetSend Session Protocol address. Hence the protocol allows an explicit specification of the target devices Session Protocol address. In the case where the target address is the sane as the destination of the SurfaceMsg the address length field should be set to 0 and no target address should be included.

The use of SurfaceMsg in response to other messages is summarised in Table 3 below.

TABLE 3

SurfaceMsg in response to other JIP messages

| In response to: | Purpose | Explanation |
|---|---|---|
| No Message | Create an impression | An expressive device can create an impression on another device by sending an unsolicited SurfaceMsg. The impressive device may then either keep the impression, or it can reject it by immediately releasing it with a SurfaceReleaseMsg reply. |
| SurfaceRequestMsg | Create an impression | An expressive device may create an impression by sending a SurfaceMsg to an impressive device in response to a SurfaceRequestMsg from that impressive device. |
| SurfaceRequestMsg | Reject a request for impression | An expressive device may reject a SurfaceRequestMsg by responding with a SurfaceMsg whose status reflects that this is a rejection. |

SurfaceDeleteMsg (Delete)

This message is used by an expressive device to notify impressive devices that the expression has been deleted. When an expressive device deletes an expression, it must notify all impressive devices which hold an impression of the delete It should also delete the entries for the expression and all impressions of it from its surface table. It must ignore any subsequent messages relating to the expression or any of its impressions.

When an impressive device receives a delete message, it should delete all entries relating to impressions of the deleted surface from its surface table. It should no longer generate any messages relating to these impressions.

There will be a short period between the expressive device issuing this message and the impressive device receiving it and deleting the impression from its surface table. The impressive device may therefore send messages relating to the expression during this period, but no practical difficulty results as the expressive device will ignore any messages relating to expressions that it has deleted. This message requires a deleted expression identifier: this is the surface identifier of the surface which the expressive device is deleting. The expressive device will ignore any subsequent messages containing this surface identifier. As the protocol is asynchronous, there may be messages referring to this surface which are still in the network.

SurfaceReleaseMsg (Unimpress)

This message is used by an impressive device to notify the expressive device that the impression has been unimpressed. When an impressive device no longer requires an impression, it deletes it from its surface table and sends the expressive device a SurfaceReleaseMsg message. The impressive device must then ignore all messages relating to the deleted impression. It is possible that a device has multiple impressions of the same surface: in this case, the impressive device will only ignore messages where they relate specifically to the unimpressed impression.

When an expressive message receives such a message, it should delete the entry relating to that specific impression from its surface table. It should no longer send any messages relating to that impression to the relevant impressive device.

There will be a short period between the impressive device issuing this message and the expressive device receiving it and deleting the entry from its surface table. The expressive device may therefore send messages relating to the impression during this period, but no practical difficulty results as the impressive device will ignore any messages relating to expressions that it has unimpressed.

This message requires an unimpressed expression identifier: this is the surface identifier for the expression of which an impression has been unimpressed by the impressive device. If this is the last remaining impression of the expression on the impressive device, then that device will ignore all subsequent messages involving this surface identifier.

Also required is an unimpressed impress identifier: each SurfaceMsg is allocated a unique identifier by the expressive device. This allows devices to distinguish between multiple impressions of the same surface. When an impression is being unimpressed, the use of the impress identifier in the SurfaceReleaseMsg allows the expressive device to determine which impression was unimpressed.

The use of SurfaceReleaseMsg in response to other messages is summarised in Table 4 below.

TABLE 4

SurfaceReleaseMsg as response to other messages

| In response to: | Purpose | Explanation |
| --- | --- | --- |
| SurfaceMsg | Releases an impression | An impressive device can notify the expressive device that it is no longer interested in the impression. The impressive device may send this message at anytime after receipt of the corresponding SurfaceMsg that "created" the impression. |
| SurfaceMsg | Rejects an impression | An impressive device can "reject" an impression by immediately responding to the SurfaceMsg with a SurfaceReleaseMsg. |

SurfaceRequestMsg (Surface Request)

This message is used by a device to request an impression from another device. The message requests one device to create an impression on the requester. The name may or may not be a valid surface name on the remote device. If the name is valid, the remote device should create an impression on the requester: if the name is not valid, the request should be rejected. The target surface identifier must be a valid identifier for an expression of which the remote device has an impression: otherwise, the request will be rejected.

When an expressive device receives a surface request, it should if necessary create the requested surface and use the impress message to impress it on the requesting device. Alternatively if the request is invalid, the expressive device should reject the request. The request identifier in the impress or reject message must be the same as the request identifier in the original request message.

Required for this message is a source surface name: this is the name of the surface of which the device wants an impression. The name is a NULL-terminated ASCII string. Also required is a source surface class: this is the class of the surface of which the device wants an impression. Two expressions may have the same name, and be distinguished by their respective classes. A target surface identifier is also required, as is a request identifier so that the surface request can be identified uniquely.

Use in relation to other JIP messages is summarised in Table 5.

TABLE 5

SurfaceRequestMsg as response to other messages

| In response to: | Purpose | Explanation |
| --- | --- | --- |
| No Message | Request an impression | An impressive device can solicit an impression by sending a SurfaceRequestMsg to another device. The device that receives this message may respond with a SurfaceMsg that either grants the request or rejects it. |
| SurfaceMsg | Request an impression of a "child-surface" | The surface description of an impression may contain references to sub-surfaces or "child-surfaces." The impressive device can request that these child-surfaces be impressed by sending a SurfaceRequestMsg to the expressive device. |

DescriptionRequestMsg (Description Request)

This message is used by an impressive device to request the description for a surface of which the device has an impression. The impression identifier must be a valid impression held by the requesting device. When the expressive device receives a request for further description it should use the description reply to return the requested description. Description requests may not be rejected, although the resulting reply may contain no data.

An impression surface identifier and a unique identifier for the request are required.

TABLE 6

DescriptionRequestMsg as response to other messages

| In response to: | Purpose | Explanation |
| --- | --- | --- |
| SurfaceMsg | Request the description of the surface. | Once a device has an impression, it may request that the expressive device provide the description of that surface by sending a DescriptionRequestMsg. This message is generally sent by the impressive device in the case where the description contained within the original SurfaceMsg was not complete. However, this message can be sent at any time after creation of an impression. |

DescriptionReplyMsg (Description Reply)

This message is used to return a description for a surface in response to a DescriptionRequestMsg message. The result of a bad request should contain no data, indicating that there is no more description for that specific request. There is no possibility of "rejecting" a description request, as a device which provides an impression of a surface has to be prepared to provide a complete description of that surface. The description reply must contain the request identifier from the description request to which it is a response.

TABLE 7

DescriptionReplyMsg as response to other messages

| In response to: | Purpose | Explanation |
|---|---|---|
| DescriptionRequestMsg | Sends the description of a surface. | An expressive device may receive a DescriptionRequestMsg from a device that has an impression. The DescriptionRequestMsg is generally sent in the case where the description contained in the original SurfaceMsg was not complete. Upon receipt of a DescriptionRequestMsg, the expressive device will respond with a DescriptionReplyMsg containing the description of the surface whose description was requested. |

ContentRequestMsg (Content Request)

This message is used by an impressive device to request some content data from an expressive device. The impression identifier must be a valid impression held by the requesting device.

A source surface identifier and a unique identifier for the request are required: information can also be provided to establish a separate communication channel for the content.

TABLE 8

ContentRequestMsg as response to other messages

| In response to: | Purpose | Explanation |
|---|---|---|
| SurfaceMsg | Requests content from a surface. | Once a device has an impression, it may request that the expressive device provide the content "contained" by that surface. The impressive device does this by sending a ContentRequestMsg to the expressive device. This message can be sent at anytime after receipt of a SurfaceMsg that creates an impression. |

ContentReplyMsg (Content Data)

This message is used by an expressive device to send some content data to an impressive device. There may be a sequence of content data messages in response to a single content request. This message is also used to reject a request for content data.

If the content provider is providing the data over a stream, it sets the stream field to the stream identifier and leaves the content length and data empty. If the content provider does not support streams, or is unable to use a stream for this purpose, it sets the stream identifier to 0 and transmits the content data as a series of content reply messages: in this case, the content length and data are used to convey the contents of the message.

Typically, the ContentReplyMsg will only be used to reject a content request if the content provider can no longer satisfy the request for internal reasons, or if the request is invalid.

In all cases, the request identifier in the reply must be set to the request identifier contained in the original request.

When a device receives a content reply it must first determine if the reply is a rejection. If so, the device has to make a decision as to its next action. If the reply is not a rejection, then the device must determine if the content is being supplied over a stream or not. If the content is being supplied over a stream, it should be read from there: if not, then the content should be read from this and subsequent replies which have the same request identifier (as transport is ordered such replies will be in sequence, and the status field will identify the final reply in the series).

A source surface identifier and a request identifier are required.

A status field is provided, with legal values set out in Table 9 below.

TABLE 9

Legal values of the status field for ContentReplyMsg

| Value | Meaning |
|---|---|
| 0 | This is a ContentReplyMsg containing content data - there will be more blocks coming for this request |
| 1 | This is the last ContentReplyMsg with data for this request id. |
| 2 | This is a ContentReplyMsg rejecting the corresponding content request. The content data will be empty. |

Use of ContentReplyMsg in response to other JIP messages is set out in Table 10 below.

TABLE 10

ContentReplyMsg as response to other messages

| In response to: | Purpose | Explanation |
|---|---|---|
| ContentRequestMsg | Sends content to requesting device. | An impressive device requesting content will send a ContentRequestMsg to the expressive device. If the ContentRequestMsg signals that the data should come over a message channel, the expressive device can then send the requested content through the use of the ContentReplyMsg. The expressive device may send one or more ContentReplyMsgs to satisfy the request |

TABLE 10-continued

ContentReplyMsg as response to other messages

| In response to: | Purpose | Explanation |
| --- | --- | --- |
| ContentRequestMsg | Rejects the request for content | An expressive device may reject the request for content by sending a ContentReplyMsg with the status value field of the header set to 2 across the message channel. Note that this is the procedure used for rejecting all content-requests, including those requesting that the data be sent over a stream channel. |

SurfaceChangeMsg (Change)

This message is used for three purposes: first, by an expressive device to notify impressive devices of a change to a surface; second, by impressive devices to request a change to an expression; and third, to notify an impressive device of a failed request to change an expression.

When an expressive device makes a change to one of its expressions, it must notify all impressive devices of the change. It does this by looking up the impressions in its surface table and sending each impressive device a change message. Where a device has multiple impressions, it is not necessary for a change message to be sent for each impression: the impressive device maintains a link between the expression and the impressions.

When an impressive device receives a change message, it needs to perform the change on each of its impressions of the changed expression. In some cases the change message contains the change itself, whereas at other times the message may only contain a notification and the impressive device has to re-fetch the content for the changed surface. If the expressive device knows the encoding of content required by each impressive device, then the expressive device can be configured to provide separate change messages each containing the content in the form required by the relevant impressive device.

When an impressive device wants to make a change to one of its impressions, it must use the change message to send a request for the change to the expressive device. The impressive device must include in the message the version of the expression to which the requested change applies.

On receiving a change request message, an expressive device must decide whether to accept the change or reject it. The decision can be based on the version and the nature of the request. An expressive device notifies the requestor as to whether the change is accepted or rejected through a change message with the appropriate status set. The expressive device also notifies all the impressive devices of an accepted change using the change message, as previously described.

An impressive device which issues a successful change request will thus receive two notifications of the change, one being the change acceptance (sent specifically to it), and the other is the change notification, which is sent to all devices with impressions of the expression. These messages can be identified as relating to the same change from either the request identifier or the version information.

The expression identifier of the surface being changed is required. Also required is an original surface version: each surface has a version number to allow an expressive device to determine what version of a surface is being changed and what state impressions of a surface are in. This field contains the version number of the surface before this change was applied. Also required is new surface version: when an expressive device issues a SurfaceChangeMsg to notify impressive devices of a change to a surface, this field contains the new version number of the surface after the change was applied. This allows the expressive device to skip version numbers. Otherwise this field should be set to 0.

A status field is provided, with values as set out in Table 11 below.

TABLE 11

Legal values of the status for SurfaceChangeMsg

| Value | Meaning |
| --- | --- |
| 0 | This is a notification from an expressive device of a change to the surface. |
| 1 | This is a request from an impressive for a change to a surface. |
| 2 | This is a rejection of a previous SurfaceChangeMsg. The change request can be identified from the surface identifier and the original version number. |

The use of SurfaceChangeMsg in response to other JIP messages is summarised in Table 12 below.

TABLE 12

SurfaceChangeMsg as response to other messages

| In response to: | Purpose | Explanation |
| --- | --- | --- |
| No Message/ SurfaceChangeMsg | Notifies impressive devices that an expression has changed. | When an expressive device changes a local expression, it needs to notify all impressive devices that currently hold impressions of the surface that there has been a change. It does this by sending out a SurfaceChangeMsg to each impressive device. (Note that the expressive device may be changing the surface due to an earlier request for change described in a SurfaceChangeMsg sent from |

TABLE 12-continued

SurfaceChangeMsg as response to other messages

| In response to: | Purpose | Explanation |
| --- | --- | --- |
| SurfaceMsg | Notifies expressive device that a change is requested. | an impressive device.) The properties of an impression may be set such that the holder of the impression can request that the original expression be changed. The impressive device makes this request by sending a SurfaceChangeMsg to the expressive device. |
| SurfaceChangeMsg | Rejects an impressive device's change request. | An expressive device may not wish to make the requested change described in a SurfaceChangeMsg that it has received. If this is the case, then it rejects the change-request by responding to the impressive device with a SurfaceChangeMsg of its own whose status value field has been set to 2. |

The use of these messages in the context of control will now be described with respect to two aspects of a control policy. Typically, each policy relates to a group of surfaces of a given class: control surfaces consequently have a specific class (or may be given a group of classes). Within a given policy, surfaces of a given class are distinguished by name or by the context in which they appear. Such surfaces are here termed "well-known surfaces" because they have a known meaning to devices that exchange them. Policies are generally optional. If two devices support a particular policy they will exchange information implementing that policy. If only one device involved in a session supports a policy, that policy will be ignored. It is entirely possible for control to be achieved using JetSend with a different set of messages to those indicated below: this control policy merely provides an effective example of how control can be achieved.

The first aspect of the policy is the provision of a "control panel" at a controlling device which provides the user with the capability to determine the parameters of the controlled device. This provides essentially steps 21 and 22 of the generic control operation shown in FIG. 2. The messages employed are illustrated in FIG. 7, which is described in detail below.

Figure 7:
FIG. 7 shows a JetSend policy for provision of a virtual control panel at a controlling device.

FIG. 7 shows a controlling device 12 and a controlled device 11, and illustrates the steps involved in the communication process between them. Firstly, in step 91, each device is initialized to enable exchange of control information: in essence, each device must be connected and aware of each others existence: a session is established between the devices.

The process is initiated by the controlling device 12, which indicates a desire to control the controlled device 11 by sending a SurfaceRequestMsg in step 92 for a control surface from controlled device 11. Different mechanisms can be established to ensure that the correct surface is requested: an appropriate solution is for the default surface of the control class to be requested (alternatively, the controlling device 12 may already have been provided with an identifier for the appropriate control surface of controlled device 11. Controlling device 12 requires no knowledge of the function of controlled device 11: all it requires is a means to ensure that it receives the appropriate surface.

Controlled device 11 receives this request and responds, in accordance with the protocol, with a SurfaceMsg in step 93 to impress its control surface upon controlling device 12. This control surface contains the choices for a series of parameters required for control of controlled device 11, together with information necessary to enable the user to make a selection from these choices: impression of this surface is effectively step 21 from FIG. 2. This information may be provided in different encodings and negotiation through a data format hierarchy may require one or more pairs of DescriptionRequestMsg and DescriptionReplyMsg messages: the e-material associated with such a SurfaceMsg message is discussed at a later point where encodings for control information are discussed.

An encoding choice is made by the controlling device 12 in step 94 with the sending of a ContentRequestMsg message for a chosen data format. This is followed with a ContentReplyMsg from the controlled device 12, which provides all the control data: this identifies all the parameter choices to be made and provides any supporting information. The controlling device 12 now has available all the information necessary for provision of control information, which will generally be in the form of a control panel display for a user. It should be noted that the control panel may comprise a plurality of surfaces (a parent surface with one or more child surfaces), in which case a number of surface and content requests and replies will be required for this step to be completed. Processing of the information to provide such a display follows in step 96, which corresponds to step 22 in FIG. 2. The provision of such a display from e-material is discussed further below: however, it is important to indicate at this point that the nature of the display itself may be highly dependent on the display functionality of controlling device 12. This may be reflected in either the encoding negotiated between the devices, or in the manner in which the controlling device is able to display control information of a particular type: both will be discussed further at a later point.

The controlling device 12 thus renders the information received in the form of a virtual control panel for controlled device 11. Controlling device 12 clearly requires a user interface sufficient that a user can interact with the virtual control panel to select parameter values. Controlling device 12 then needs to pass these selections back to the controlled device 11. The controlling device 12 needs have no knowledge of the meaning of a particular parameter (for example, what it means for a paramater labelled "Power" to be set to ON), but it does need to have an understanding of the types of operation which a user is allowed to make: however, this should be provided in the e-material already provided by the controlled device 11.

Figure 8:
FIG. 8 shows a JetSend policy for user control of a controlled device using a virtual control panel.

A second aspect of the control policy relates to these steps of passing user selections back to the controlled device, corresponding to steps 23 to 25 in FIG. 2. This aspect is illustrated in FIG. 8, and discussed further below.

User interaction with the virtual control panel has given rise to a parameter choice selection which is to be passed back to the controlled device 11. This is accomplished with a SurfaceChangeMsg message in step 101: as the controlling device 12 has only an impression of the control surface, it cannot make changes itself but only request the controlled device 11 to make changes to the expression, which it owns. Although not explicitly discussed above with respect to SurfaceChangeMsg, this step may be followed with additional steps providing change content: however, the most practical approach will generally be to identify all changes required in the SurfaceChangeMsg.

The controlled device 11 is now able to accept or reject the changes to the control panel with a further SurfaceChangeMsg in step 102. If the choices offered by the controlling device 12 are legal and can be understood by the controlled device 11, the change to the control surface identified with the original SurfaceChangeMsg will generally be accepted. If required, further content may be provided by the controlled device at this point. The virtual control panel will generally reflect the current parameter choices, and local updating from the updated surface will be required after any accepted change at both controlling and controlled devices: at the controlled device 11 to change the device function according to the selected parameter choices, and at controlling device 12 so that the virtual control panel reflects the choices adopted.

The nature and format of e-material will now be briefly described, after which e-material types and considerations useful in aspects of the invention will be discussed.

As previously indicated, e-material is the form in which a surface is expressed. E-material comprises both description and content. The description is used by JetSend to negotiate the exchange of content. The description sets out the attributes of the surface. These attributes typically form a hierarchy of choices encompassing a number of attribute levels. These attributes indicate how information can be conveyed: the content itself is the perceivable information to be transferred.

A successful exchange of a surface between appliances requires that each attribute level describing the surface be identified and processed. The process of identifying and processing these levels between the appliances is called negotiation. Once the complete surface description has been negotiated, the surface content is exchanged.

The exchange of a surface between two JetSend appliances involves surface interaction messages as defined in the JIP. A surface description may be completed using description requests and description replies. The surface content exchange is completed using content requests and content replies. Under limited circumstances, surface content may be included in the surface description; this is called in-line content. With in-line content and a small description, an exchange may require only a single message. More commonly several messages are exchanged.

E-material is provided in the form of e-material blocks. At one level an e-material block can be represented in a two column table with attribute names in the first column and attribute values in the second column. An attribute name is a single specific keyword: an attribute value is a value, or a number of values, associated with an attribute. When an attribute value is specified as a list of values, they appear as a space-separated list in the value field. The attribute-value pairs which appear in the e-material block are applicable to some portion of a JetSend surface. These attribute-value pairs may apply to the whole surface or to a specific portion of the surface. All attributes and some values are drawn from a limited set of predefined keywords. These are denoted in this specification by a "v" prefix such as vEncoding. Some values are drawn from a set of data types. These are denoted in this specification by an "em" prefix such as emListType. In this specification, there are a number of representational types defined to simplify the discussion of the grammar-like structure of JetSend surfaces: these will be indicated by appropriate identifiers, generally in the value field.

Certain attributes are associated with a set of values which offer a selection. Each set of values is called a selection list. Selection lists appear as a space-separated list in the value column of a two-column table. During the negotiation process, each attributes takes one value from the selection list. The selection of each value lends to the identification and processing of each attribute level of the surface description. For convenience in this implementation, it is made a rule that attribute data that can be lists must be encoded as lists—even if they contain only one value.

As the levels are identified and processed, the attributes which take selection lists and the selected values are enumerated in an e-material block. Attributes which do not take selection lists are omitted. This e-material block is called a decision block, since it represents the decisions as to the specific attributes of the e-material. The description request and content request include an e-material block which indicates the attributes of the e-material being requested.

An attribute block is an e-material block which sets out all the attribute-value pairs pertaining to a specific attribute level of the surface description. A surface description block is an ordered set of attribute blocks. A surface description block may be represented as a three-column table with attribute blocks occupying the last two columns. The first column of the table contains a decision path applicable to each attribute block. A decision path is constructed using the values from the decision block. These are concatenated together in a dot notation in the same order as the attribute blocks. Thus an attribute block applicable to an image might be qualified by a decision path such as vImage.vGray.8.(300, 300).vRLE, indicating that it is a run-length encoded image with 300 by 300 dpi resolution and 8 bits per pixel gray scale. This notation describes the composition of the surface which is called the encoding hierarchy. The root of this hierarchy is called the null level.

The encoding hierarchy forms a tree-like structure. Each node in this structure is an attribute level. A level is terminal if none of the attributes that it contains takes selection lists or requires further description. The decision path gives the set of decisions down the tree to the level indicated in the encoding hierarchy field. Each value in the decision path indicates descent to a next level down the encoding hierarchy tree, and the last value in the decision path is the name of the attribute level. A surface description is known to be complete when the level in the encoding hierarchy is known to be terminal.

Some surfaces within the surface hierarchy have one or more child surfaces. These child surfaces are organized in one or more ordered child lists which are distinct for each parent surface. A child list may be well characterized, such as a list of images and text blocks on one side of one page. However it may not be fully available at any given time. Consider a stack of pages being scanned by a multi-page scanner. While a number, designation, and content exists for each page, the child list which reflects the composition of the stack is not so readily available at any given time. Such surfaces may not be created until they are requested, or at some other future time appropriate for relevant device operation. The child list when characterized gives the names of the child surfaces related to a parent surface. In the surface description table, this is called a reference list.

A decision path is constructed from the values in a decision block. These values are in turn taken from selection lists. The encoding hierarchy is expressed in terms of these decision paths. The decision paths are used to identify the level of each attribute block.

Further details of the e-material grammar and terminology are provided in the U.S. patent application Ser. No. 60/054,047 filed on Jul. 18, 1997 and entitled "HP JetSend Protocol Specification" and subsequent applications in the United States of America and elsewhere (entitled "Method and Apparatus for Device Interaction by Protocol" and "Method and Apparatus for Device Interaction by Format") claiming priority therefrom.

To ensure that JetSend appliances communicate under all circumstances, specific decision paths must in general be present. These are called default encodings. Sending appliances must be able to produce e-material with the attributes described by these default decision paths. Similarly receiving appliances must be able to interpret e-material with these characteristics. Default encodings are present to ensure that appliances will exchange e-material under normal conditions. These encodings are the lowest common characteristics. (It should be noted that this does not necessarily apply to the change of an existing surface: if a surface with an impression, such as the controlling device 12 in the control policy discussed above, requests a change through a SurfaceChangeMsg message, it is not sensible for the message to be required to relate to any encoding other than that already selected for the impression.) Base encodings are recommended decision paths which permit appliances to exchange e-material with a higher degree of fidelity. Other attributes and values are considered optional.

The default encodings are decision paths, each element of which comes from a selection list. Associated with each selection list is an attribute. Each of the attributes whose values make up a default encoding must be present in the surface description.

The application of these principles to control will now be discussed. Firstly, necessary and optional features of a control encoding will be considered.

For a control encoding to be useful, it is necessary for it to be able to address two basic requirements. One of these requirements is for the encoding to represent the control panel in such a way that it can be rendered on an appliance other than that from which it originates. The other is that the encoding must define a way of representing changes made to the control panel in such a way that the device receiving the representation of the change can interpret the representation of the changes unambiguously.

Other features are desirable, rather than essential. One is for the encoding to be useful for a range of platforms. This is not essential, as alternative encodings can be offered, provided that at least one encoding is offered that can be understood by any possible controlling device. While an ideal encoding should allow the virtual control panel to be displayed and manipulated on as many different appliances as possible, there is a trade-off between the capability to allow user-interface designers to specify precisely the appearance and behaviour of a user interface, and the achievement of a degree of abstraction sufficient to enable the virtual control panel to be rendered on devices with a wide range of capabilities. However, even with highly specific encodings, it is intended that device capabilities (eg screen size, input device) should determine whether an encoding can be accepted, rather than device type features such as device operating system. High levels of abstraction allow for a wide range of representation possibilities for devices of different capability: this will be discussed further below with respect to a choice of mandatory encoding for control, Control Script.

A further desirable feature is for the encoding to require little data to represent the virtual control panel and any changes made to it. As the bandwidth of any communications channel is finite, and as the network independence of JetSend means that it could be employed over substantially any communications channel, this feature is desirable to minimise the likelihood of very long response times in establishing and using the virtual control panel.

It is not essential for the operation of control in JetSend that a negotiation as to encoding occurs: it is possible for all control operations to be specified under a standard Control Script encoding and in such a way that only one Control Script is provided. However, it is desirable for a plurality of encodings to be provided to enable optimal display to be made for different devices: an example of an alternative encoding here is HTML, and elements of an HTML encoding are briefly described after the discussion of Control Script. Another useful encoding choice employs Java applications to describe the control choices and their presentation. It is also often desirable for negotiation to occur for a given encoding: for example, if Control Script is requested, different Control Script content may be provided according to the capabilities of the controlling device 12, as could be established through negotiation.

Control Script will now be discussed. Control Script is adapted to describe a series of control options, rather than attempting to define the appearance of a control panel. A minimal number of assumptions about the display or input capabilities of the controlling device are made: consequently even a very simple controlling device can be used for a complex and sophisticated controlled device. Controlling devices capable of sophisticated interaction are however capable of using the Control Script description to provide user interfaces appropriate to their capabilities. Control Script can thus be used as an encoding for any controlling device, from a minimal controller to a data glove or a virtual reality headset.

As Control Script is intended for use as a mandatory encoding, it is adapted for use with a minimal user interface. Obviously, it is advisable to require certain features of a minimal user interface: it will not be practical to design an encoding suitable for control with, say, one LED and one button (in principle such an encoding could be designed and used in accordance with the invention—it would however only be useful in certain limited contexts) as the mandatory control encoding, as such an encoding would be extremely inefficient for most control panels. The limit chosen for Control Script is a display capable of showing two lines of sixteen alphanumeric characters, together with four control buttons. A computer simulation of such a display is provided in FIG. 9.

Figure 9:
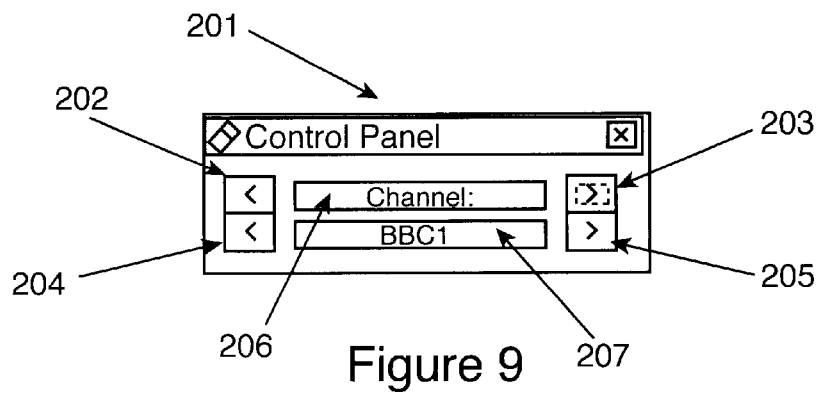
FIG. 9 shows a minimal user interface supported by the Control Script encoding.

The minimal display 201 of FIG. 9 has a first display line 206 and a second display line 207. To the left and right, as implemented here, of the first display line 206 are first button 202 and second button 203. To the left and right, as implemented here, of the second display line 207 are third button 204 and fourth button 205. The proposed method of use of such a minimal display is for a parameter label to be displayed on first display line 206 with a choice for that parameter being displayed on second display line 207. First and second buttons 202, 203 are used to move backward and forward respectively through the parameters available for selection. Third and fourth buttons 204, 205 are used to move backward and forward respectively through the choices available for the parameter indicated in the first display line 206.

An exemplary grammar for Control Script is now indicated. It is clear from the above description of the minimal appliance user interface that parameters can only take one of two types of value: a text string chosen from a list of possibilities (an enumerated choice), or a number set between upper and lower limits (a range). A grammar is not here explicitly defined, but is illustrated with examples for each of these types, with Control Script shown in italics.

Enumerated Choices: Channel:[BBC1/BBC2/ITV/C4]

This script indicates that the user may choose between a number of options. In this case the parameter labelled "Channel" may take on the value of "BBC1", "BBC2", "ITV" or "C4". The symbols "[" and "]" delimit the start and end of the values available, and / indicates a logical exclusive OR. ":" is used to link a parameter and its available values.

Ranges: Copies:[1 . . . 10 ]

In this example, the parameter labelled "Copies" is to have a user selected value between 1 and 10. The grammar may be defined such that this has to be an integer value.

Mixed Types: Volume:[Mute/1 . . . 10]

A range may be an element in an enumerated choice list. Here, "Volume" may take on the value "Mute" or a number between 1 and 10.

Aggregation of Controls:

Television[
  Power:[on/off]
  & Volume:[Mute/1 . . . 10]
  & Channel:[BBC1/BBC2/ITV/C4]

In this script, a number of controls have been combined together to form a group using the "&" symbol to indicate a logical AND operation. The outer brackets are used to define a meta-control, Television: this meta-control (which could here act as the label for the virtual control panel) consists of a control "Power" which can take the values "on" and "off" and "Volume" and "Channel" controls as described above.

Complex Controls:

Camera[
  Manual:[
    Aperture:[1 . . . 50]
    & Shutter Speed:[1 . . . 50]
  ]
  / Pre-set:[Pre-set 1/Pre-set 2/Pre-set 3]
  / Automatic
]

This complex control for a simple camera is obtained by combining the features described above. The user can choose to set the camera to be in any one of three different modes. In "Manual", the user must specify values for both aperture and shutter speed, whereas in "Pre-set" the user must choose from three pre-set modes and in "Automatic" no further user input is required.

The application of these scripts to the minimal user interface is straightforward. For example, for the camera example above, only the parameters arising for the default choice could be initially presented as options scrollable with the buttons, other parameters appearing when a different choice is made for the camera mode. For a more richly specified user interface (having buttons, pull-down menus, sliders, radio buttons, directory trees etc.), it is necessary for a set of rules to be put into place to allow an appropriate user interface to be generated. Such a set of rules can be device-specific (or user interface specific) as it relates only to how the displaying device itself displays different classes of information (regardless of the actual information content). Style guides for common user interfaces are available, and by imposition of additional rules the skilled man would appreciate that these can readily be converted into a process for automatic user interface generation. Examples in the literature are provided by Olsen D. in "A Programming Language Basis for User Interface Management", Human Factors in Computing Systems, CHI'89 Conference Proceedings, May 1989, pp 171–176, which relates to generation of a Macintosh user interface from embedded Pascal; by Wiecha, C. et al in "Generating Highly Interactive User Interfaces", Human Factors in Computing Systems, CHI'89 Conference Proceedings, May 1989, pp 277–282 and by Zanden, B. Vander and Myers, B. A. in "Automatic, Look-and-feel independent Dialog Creation for Graphical User Interfaces" Human Factors in Computing Systems, CHI'90 Conference Proceedings, April 1990, pp 27–34, which both relate to creation of Motif dialog boxes; by de Baar, D. et al in "Coupling Application Design and User Interface Design", Human Factors in Computing Systems, CHI'92 Conference Proceedings, May 1992, pp 259–266 which relates to the OpenLook GUI; and by Johnson, J. in "Selectors: Going Beyond User-Interface Widgets", Human Factors in Computing Systems, CHI'92 Conference Proceedings, May 1992, pp 273–279, which relates to semi-automatic construction of user interfaces from objects classified according to their interface semantics rather than their appearance.

As an example of automatic generation of a virtual control panel from Control Script for a richer user interface, a pseudocode program is provided below which generates a dialog box according to the following sets of rules.

Control Choice

As Control Script contains no information about user interface controls, the programmer is free to make a sensible choice for the user interface concerned.

1. Any parameter that is described by a range only is represented by a slider bar labelled with the parameter name.
2. Any parameter that has 5 or more simple choices (ie choices that do not themselves require further controls to be set) is represented by a list box.
3. A parameter described by a choice of a range or a single alternative is represented by a slider bar and a check box.
4. Any remaining parameter is represented by a collection of radio buttons Layout of Controls Similarly, the programmer is free to choose sensible rules for layout.

1. Controls are placed from top to bottom of the dialog box, in the order that they appear in the Control Script.
2. Controls whose use is dependent on other controls being set (sub-controls) are indented with respect to their "parent" control.
3. The dialog box is resized to accommodate the controls within it.

The pseudocode parses a control script into an alternative data structure, then from this data structure and the set of basic rules above, calculates which of a set of widgets to represent each control element with. It then calls a set of functions (not given here) to generate these widgets and place according to the rules above on a dialog box. The pseudocode is not specific to a particular operating system, but the man skilled in the art will readily understand how to apply this pseudocode to a given operation system, such as Microsoft Windows.

/* ControlElementType—structure used represent each element in the Control Script */
struct {

| String | Name; |
|---|---|
| ControlElementType | *NextSibling; |
| ControlElementType | *PrevSibling; |
| SelectorType | *ParentSelector; |
| SelectorType | *ChildSelector; |
| ControlWidgetType | Widget; |

} ControlElementType;
/* SelectorType—structure used to link a Control Element to the various values it can take */
struct{

| SelectorType | *NextSelector; |
|---|---|
| SelectorType | *PrevSelector; |
| ControlElementType | *ParentControlElement; |
| ControlElementType | *ParentControlElement; |

} SelectorType;
/* ControlWidgetType—union of all available types of control elements (widgets, etc) */
union {
    "GROUP_OF_RADIO_BUTTONS"
    "SLIDER_BAR"
    "CHOICE"
    .
    .
    .
} ControlWidgetType;
/* "MAIN FUNCTION */
Main( )
{
ControlElementType *TheControlStructure;
    TheControlStructure = ParseControlFromString(ControlScript, NULL);
    AnalyseControl(TheControlStructure);
    CreateControlWidget(TheControlStructure);
    ResizeDialogBoxToFitControls(....);
}
/* PARSE THE CONTROL SCRIPT INTO A DIFFERENT DATA STRUCTURE */
ControlElementType* ParseControlFromString(String *ControlScript, void *ParentSelector)
{
    // Read the next Symbol from the control script
    String Symbol(GetNextSymbol(TheString));
    // Initialise the record of this Control Element
    p_ControlElement=new ControlElementType;
    p_ControlElement->Name, Symbol);
    p_ControlElement->NextSibling = NULL;
    p_ControlElement->PrevSibling = NULL;
    p_ControlElement->ChildSelector = NULL;
    p_ControlElement->ParentSelector = ParentSelector;
    p_FirstControl = p_Control;
    // Read the next Symbol from the control script
    String Symbol(GetNextSymbol(TheString));
    while ((Symbol != "]") && (StringLength(TheControlScript)>0) ) {
        // While not the end of the Control Element or the end of the Control Script
        if (Symbol == "[") { // Create a new Selector to be the child of this Control Element
            p_NewSelector = new SelectorType;
            p_ControlElement->ChildSelector = p_NewSelector;
            p_NewSelector->NextSelector = NULL;
            p_NewSelector->PrevSelector = NULL;
            p_NewSelector->ParentControlElement = p_ControlElement;
            p_NewSelector->ChildControlElement = ParseControlFromString(TheControlScript, p_NewSelector);
        }
        else if (Symbol =="|") { // Create a new Control Element to be a sibling to this Control Element
            p_NewControlElement = new ControlElementType;
            p_ControlElement->NextSibling = p_NewControlElement;
            p_NewControlElement->PrevSibling = p_ControlElement;
            p_NewControlElement->NextSibling = NULL;
            p_NewControlElement->ChildSelector = NULL;
            p_NewControlElement->ParentSelector = ParentSelector;
            p_NewControlElement->Name = GetNextSymbol(TheString));
            p_ControlElement = p_NewControlElement;
        }
        else if (Symbol == ∓&") { // Create a new Selector to be a sibling to the current Selector
            p_NewSelector = new SelectorType;
            p_CurrentSelector = p_ControlElement->ParentSelector;
            p_ParentControlElement = p_CurrentSelector->ParentControlElement;
            p_CurrentSelector->NextSelector = p_NewSelector;
            p_NewSelector->PrevSelector = p_CurrentSelector;
            p_NewSelector->NextSelector = NULL;
            p_NewSelector->ParentControlElement = p_ParentControlElement;
            p_NewSelector->ChildControlElement = ParseControlFromString(TheControlScript, p_NewSelector);
        }
        // Read the next Symbol from the control script
        String Symbol(GetNextSymbol(TheString));
    }
    return p_FirstControl;
}
/* DETERMINE WHICH WIDGET TYPE TO USE FOR EACH CONTROL ELEMENT */
ControlWidgetType AnalyseControl(ControlElementType *Control Element)
{
TheSelector = ControlElement->ChildSelector;
    if (TheSelector != NULL) {
        // if the Control Element has at least one Child Selector;
        NumberOfChoices = 0;
        NumberOfRanges = 0;

```
    NumberOfSubControls = 0;
    do {
       SubControl = TheSelector->ChildControl;
       do {
          ControlType = AnalyseControl(SubControl);
          if (ControlType = "RANGE") {
             NumberOfRanges++;
          }
          if (ControlType = "CHOICE") {
             NumberOfChoices++;
          }
          if (ControlType, "SUB_CONTROL") {
             NumberOfSubControls++;
          }
       } while( (SubControl = SubControl->NextSibling)
          !=NULL);
    } while( (Selector = Selector->NextSelector)
       !=NULL);
    if ((Ranges==1)&&(Choices==0)) {
       // This control element will be represented by a slider
          bar;
       ControlElement->Widget = "SLIDER_BAR";
    }
    if ((Ranges==1)&&(Choices==1)) {
       // This control element will be represented by a slider
          bar and a check box;
       ControlElement->Widget = "SLIDER_BAR_
          AND_CHECK_BOX";
    }
    if ((Choices<5)&&(Choices>1)) {
       // This control element will be represented by a group
          of radio buttons;
       ControlElement->Widget = "GROUP_OF_
          RADIO_BUTTONS";
    }
    if ((Choices>=5)) {
       // This control element will be represented by a list
          box;
       ControlElement->Widget = "LIST_BOX";
    }
    if (Controls>0) {
       // This control element will be represented by a label
          only;
       ControlElement->Widget = "LABEL";
    }
    return "SUB_CONTROL";
  }
  else {
    int Min, Max, Value;
    if (sscanf(ControlElement->Name, "%d..%d..%d",
       &Min, &Max,
&Value)==3) {
  ControlElement->Widget = "RANGE";
  return "RANGE";
    }
    else {
       ControlElement->Widget = "LABEL";
       return "CHOICE";
    }
  }
}
/*** CREATE THE WIDGET FOR EACH CONTROL
   ELEMENT ***/
void CreateControlWidget(ControlElementType*
   ControlElement)
{
    DistanceFromTop = 10;
    IndentFromLeft = 10;
    if (ControlElement->Widget == "LABEL") {
       if (ControlElement->ParentSelector != NULL) {
          if ( (ControlElement->NextSibling==NULL) &&
             (ControlElement->PrevSibling==NULL) )
             CreateLabel(ControlElement->Name, ...);
          else  CreateRadioButton(ControlElement->Name,
             ...);
          PreviousIndentFromLeft = IndentFromLeft;
          IndentFromLeft += 20;
          DistanceFromTop += 20;
       }
       Selector = ControlElement->ChildSelector;
       do{
          NewControlElement     =     Selector-
             >ChildControlElement;
          do {
             CreateControl(NewControlElement);
          }   while(   (NewControlElement   =
             NewControlElement->NextSibling) != NULL);
       }while( (Selector = Selector->NextSelector) !=
          NULL);
       if (ControlElement->ParentSelector != NULL) {
          IndentFromLeft = PreviousIndentFromLeft;
          DistanceFromTop += 10;
       }
    }
    else if(ControlElement->Widget == "GROUP_OF_
       RADIO_BUTTONS") {
       if ( (ControlElement->NextSibling == NULL) &&
          (ControlElement->PrevSibling == NULL) )
          CreateLabel(ControlElement->Name, ...);
       else CreateRadioButton(ControlElement->Name, ...);
       PreviousIndentFromLeft = IndentFromLeft;
       IndentFromLeft += 20;
       DistanceFromTop += 16;
       Selector = (SelectorType*)ControlElement-
          >ChildSelector;
       do {
          NewControl = Selector->ChildControl;
          do {
             CreateControl(NewControl);
          } while((NewControl = NewControl->NextSibling)
             != NULL);
       } while( (Selector = Selector->NextSelector) !=
          NULL);
       IndentFromLeft+= PreviousIndentFromLeft;
       DistanceFromTop += 10;
    }
    else if( ControlElement->Widget == "SLIDER_BAR") {
       if ((Control->NextSibling==NULL)&&(Control-
          >PrevSibling==NULL))   CreateLabel
          (ControlElement->Name, ...);
       else CreateRadioButton(ControlElement->Name, ...);
    CreateSliderBar( );
    }
    else if ...
    }
    .
    .
    .
}
```

Such rules as indicated above are of course exemplary. Any such sensible selection of rules may be chosen for this or other user interfaces, with appropriate utilisation of the available user interface capabilities.

Figure 10A:
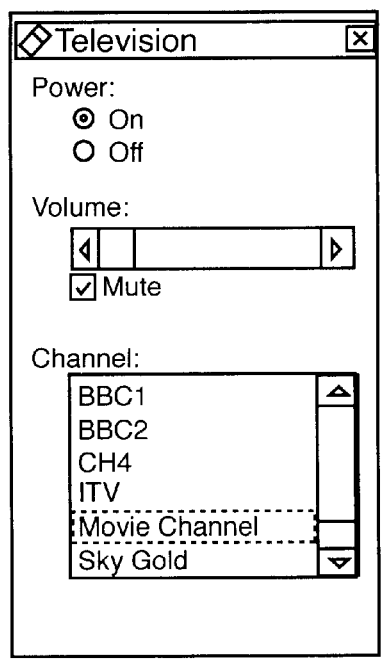
FIGS. 10a and 10b show Windows user interfaces automatically generated from Control Script encodings.
Figure 10B:
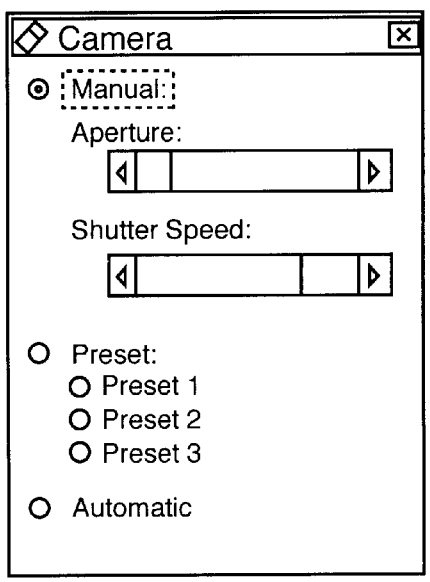

Virtual control panels for the "Television" and "Camera" examples above are shown in FIGS. 10a and 10b respectively. As can be seen, perfectly satisfactory uses of the Windows user interface result. However, for such a user interface it may be desirable to negotiate a more powerful encoding which allows for a richer use of the functionality of the user interface. This could be still Control Script, but including optional elements not included in the basic grammar: for example, specific scripts could be provided for colour wheels, or for rendering patterns or other images.

Figure 12:
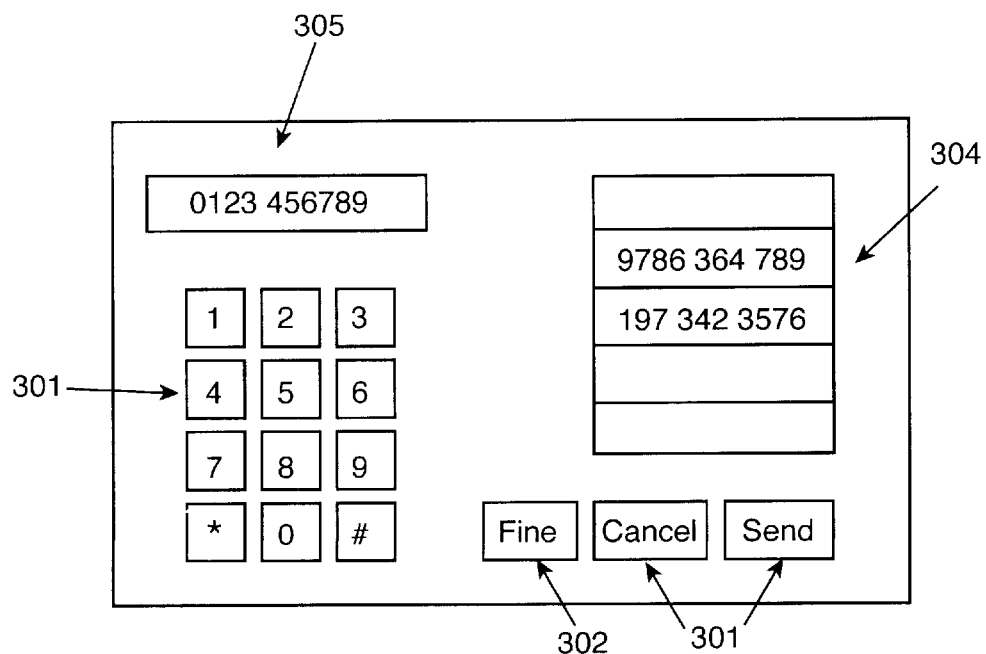
FIG. 12 shows a fax machine user interface which can be generated with an encoding which defines a set of user interface controls.

An alternative approach is to provide an encoding which defines a set of controls that can be used by a target range of appliances together with layout information For example, implementable controls could be a bellpush button changeable by a "push" and then returning a value on activation (useful in constructing an on display keypad), a bistable button (an on-off switch) changeable by a "push" and toggling the value from a choice of two on activation, a slider changeable by movement, with the new slider position providing a returnable value, a menu with value changeable by selection of a menu item, and text with value changeable upon user entry of new text. From such controls and placement information, a user interface can be created: FIG. 12 shows a fax user interface with bellpush buttons 301, bistable button 302, menu 304 and text field 305. In an appropriate implementation, a number can be entered into text field 305 by separate keyboard entry or by use of the virtual keyboard created with bellpush buttons 301.

Alternatively, a different encoding type altogether may be negotiated: an example is an HTML encodimg employing the Forms extension. Arbitrary text strings, basic layout information and widget types are defined in the HTML encoding, but appearance of the resulting page can be largely determined by the client and can thus be adapted to a wide range of displays.

Figure 11A:
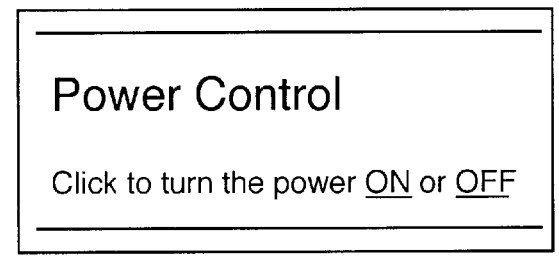
FIGS. 11a and 11b show user interfaces generated from HTML encodings.
Figure 11B:
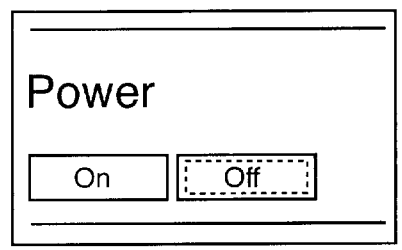

An exemplary part of an HTML script for the "Power" example given above is
<HR>
<H1>Power Control</H1>
Click to turn the power <A HREF="Power=on">ON</A> or <A HREF="Power=off">OFF</A>
<HR>
without the Forms extension, and
<HR>
<H1>Power</H1>
<INPUT TYPE=SUBMIT VALUE="On">
<INPUT TYPE=SUBMIT VALUE="Off">
<HR>
which can be rendered by the controlling device as shown in FIGS. 11a and 11b respectively.

The method of controlling one device from another described here is valuably and effectively implemented in the context of the JetSend protocol. However, as indicated above, the present invention has very general application in control of one device by another, and is not limited to application in JetSend or similar protocols, but is applicable to almost any problem of control of one device by another.

We claim:

1. A method for the control of a controlled device by means of a controlling device, comprising:

establishment of a signal transmission system between the controlling device and the controlled device;

provision by the controlled device of a set of possible parameter choices and information identifying said possible parameter choices and transmission thereof to the controlling device;

display at the controlling device of the set of possible parameter choices and of information identifying possible parameter choices to enable user selection of a set of actual parameter choices with a user selection apparatus;

transmission of the set of actual parameter choices to the controlled device; and modification of operational parameters of the controlled device in accordance with the set of actual parameter choices;

wherein the set of possible parameter choices and set of actual parameter choices are provided in a form independent of the user selection apparatus.

2. A method as claimed in claim 1, wherein the steps of user selection of a set of actual parameter choices, of transmission of the set of actual parameter choices, and of modification of the operational parameters of the controlled device in accordance with the set of actual parameter choices are repeated as a sequence whenever the user wishes to modify his selection of actual parameter choices.

3. A method as claimed in claim 1, wherein the set of possible parameter choices is arranged as a hierarchy, wherein user selection of a given parameter choice may require user selection of another parameter choice not required if the given parameter choice had not been selected.

4. A method as claimed in claim 1, wherein between establishment of a signal transmission system between the controlling device and the controlled device and transmission by the controlled device of a set of possible parameter choices and information identifying said possible parameter choices to the controlling device, there is provided the step of the controlling device requesting a set of possible parameter choices and information identifying said possible parameter choices from the controlled device.

5. A method as claimed in claim 1, wherein the set of possible parameter choices and information relating to the possible parameter choices is provided in the form of a control script indicating for each parameter the possible parameter choices, a type for that parameter, and user interpretable parameter information.

6. A method as claimed in claim 5, wherein the controlling device is adapted to display each type of parameter according to a predetermined display rule.

7. A method as claimed in claim 1, wherein the set of possible parameter choices and information relating to the possible parameter choices is provided in a markup language.

8. A method as claimed in claim 1, wherein the display at the controlling device of the set of possible parameter choices and of information identifying possible parameter choices comprises rendering of a control panel for display to a user wherein the user can interact with the control panel to provide a set of actual parameter choices.

9. A method as claimed in claim 8, wherein the representation of a given parameter choice in the control panel is independent of a function of the parameter but dependent on the type of choices available for that parameter.

10. A method as claimed in claim 1, wherein the display at the controlling device of the set of possible parameter choices and of information identifying possible parameter choices comprises making the set of possible parameter choices and the information available to a means capable of interpreting the information and returning a selection of actual parameter choices from the set of possible parameter choices.

11. A method as claimed in claim 1, wherein each passage of information between the controlling device and the controlled device consists of one or more interactions from an interaction set, none of the interactions of the interaction set being dependent on the function to be carried out on the information by either of the devices.

12. A method according to claim 11, wherein each passage of information relates to sharing of a surface between the devices, wherein the surface is a representation of the internal state of the controlled device.

13. A method according to claim 12, wherein each surface comprises data and a set of formats in which the data can be provided by the controlled device.

14. A method as claimed in claim 12, wherein the interaction set comprises an interaction for the sharing of a surface in one surface with one or more devices not having that surface.

15. A method as claimed in claim 12, wherein the interaction set comprises interactions relating to transfer of content between a surface in a first device and the corresponding surface in one or more second devices.

16. A method as claimed in claim 12, wherein the interaction set comprises interactions relating to deletion or modification of surfaces in one or more second devices corresponding to a surface in a first device.

17. A method as claimed in claim 12, wherein the surface comprises a class indicating the function of the surface.

18. A method as claimed in claim 12, wherein the interaction set comprises a request for a surface by a second device from a first device.

19. A method as claimed in claim 12, wherein the interaction set comprises a request for a description of a surface by a second device from a first device, wherein the description of a surface comprises a hierarchy of choices for provision of data associated with that surface.

20. A method as claimed in claim 12, wherein the interaction set comprises a request for provision of data associated with the surface.

21. A method as claimed in claim 20, wherein the interaction set comprises a response to a request for provision of data associated with the surface.

22. A method as claimed in claim 12, wherein the interaction set comprises a message requesting a change to a surface.

23. A method as claimed in claim 22, wherein the message for requesting a change to a surface is also usable to effect or deny a change to a surface.

24. A method as claimed in claim 1, wherein for information passed between the controlling device and the controlled device, the information transmitted comprises a data format hierarchy, wherein a device intended to receive transmitted data evaluates the data format hierarchy and determines the format in which the data is then received thereby.

25. A method as claimed in claim 24, wherein the receiving device determines the format in which the data is then received by a response to the transmitting device comprising a path through the data format hierarchy.

26. A method as claimed in claim 24, wherein all data formats comprise one or more of a plurality of data format types, and wherein for each data format type, there exists a data format receivable by any device supporting that data format type.

27. A method as claimed in claim 24, wherein a data format hierarchy comprises a hierarchical structure, a set of keywords relating to properties of the information transmitted and values associated with each of the keywords.

28. A method as claimed in claim 27, wherein each data format hierarchy comprises a single encoding, wherein each encoding represents a different basic form in which information can be presented.

29. A method as claimed in claim 1, wherein the controlling device and controlled device are information handling devices.

30. A method as claimed in claim 29, wherein the controlling device and the controlled device are connected through an information transmission network.

31. A method as claimed in claim 1, wherein the user selection apparatus comprises a graphical user interface.

32. An information handling device adapted for the function of a controlling device in a method for the control of a controlled device by means of a controlling device, the method comprising establishment of a signal transmission system between the controlling device and the controlled device, provision by the controlled device of a set of possible parameter choices and information identifying said possible parameter choices and transmission thereof to the controlling device, display at the controlling device of the set of possible parameter choices and of information identifying possible parameter choices to enable user selection of a set of actual parameter choices with a user selection apparatus, transmission of the set of actual parameter choices to the controlled device, and modification of operational parameters of the controlled device in accordance with the set of actual parameter choices, wherein the set of possible parameter choices and set of actual parameter choices are provided in a form independent of the user selection apparatus;

the information handling device comprising:

means for communication of information with a controlled device;

user interface means for displaying information to a user and for returning values derived from a user input; and means for presenting the set of possible parameter choices and associated information received from the controlled device through the user interface means, and for returning the set of actual parameter choices from the user interface means to the controlled device.

33. An information handling device adapted for the function of a controlled device in a method for the control of a controlled device by means of a controlling device, the method comprising establishment of a signal transmission system between the controlling device and the controlled device, provision by the controlled device of a set of possible parameter choices and information identifying said possible parameter choices and transmission thereof to the controlling device, display at the controlling device of the set of possible parameter choices and of information identifying possible parameter choices to enable user selection of a set of actual parameter choices with a user selection apparatus, transmission of the set of actual parameter choices to the controlled device, and modification of operational parameters of the controlled device in accordance with the set of actual parameter choices, wherein the set of possible parameter choices and set of actual parameter choices are provided in a form independent of the user selection apparatus;

the information handling device comprising:

means for communication with a controlling device; and means for providing the set of possible parameter choices and associated information to a controlling device, and for modification of the operational parameters of the device in accordance with the set of actual parameter choices.

* * * * *